US010637622B2

(12) United States Patent
Lee et al.

(10) Patent No.: US 10,637,622 B2
(45) Date of Patent: Apr. 28, 2020

(54) COMMON REFERENCE SIGNALS FOR MULTIPLE SEARCH SPACES WITHIN A CONTROL RESOURCE SET

(71) Applicant: QUALCOMM Incorporated, San Diego, CA (US)

(72) Inventors: Heechoon Lee, San Diego, CA (US); Makesh Pravin John Wilson, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/015,056

(22) Filed: Jun. 21, 2018

(65) Prior Publication Data

US 2018/0375628 A1  Dec. 27, 2018

Related U.S. Application Data

(60) Provisional application No. 62/525,611, filed on Jun. 27, 2017.

(51) Int. Cl.
*H04L 5/00* (2006.01)
*H04W 72/04* (2009.01)
(Continued)

(52) U.S. Cl.
CPC .......... *H04L 5/0048* (2013.01); *H04L 5/0053* (2013.01); *H04L 5/0091* (2013.01);
(Continued)

(58) Field of Classification Search
CPC ... H04L 5/0048; H04L 5/0053; H04L 5/0091; H04L 25/0202; H04L 1/0038; H04W 72/0406; H04W 72/042; H04B 7/0413
See application file for complete search history.

(56) References Cited

U.S. PATENT DOCUMENTS

2016/0043849 A1   2/2016 Lee et al.
2018/0115399 A1*  4/2018 Takeda .................. H04L 5/0016
(Continued)

OTHER PUBLICATIONS

Braun et al., "5G NR Physical Downlink Control Channel: Design, Performance and Enhancements", Apr. 15-18, 2019, 2019 IEEE Wireless Communications and Networking Conference (Year: 2019).*
(Continued)

*Primary Examiner* — Brian T O Connor
(74) *Attorney, Agent, or Firm* — Holland & Hart LLP/Qualcomm

(57) ABSTRACT

Methods, systems, and devices for wireless communication are described. In some wireless communications systems, a base station may transmit control information to a user equipment (UE) in a control resource set (coreset) of a transmission time interval (TTI). As described herein, the base station may transmit common control information in a common search space (CSS) of the coreset and a UE-specific control information in a UE-specific search space (USS) of the same coreset. In addition, the base station may transmit reference signals in the coreset to allow the UE to perform channel estimation to correctly decode or demodulate the control information in the CSS and USS of the coreset. In some examples, the reference signals transmitted in the CSS and USS of the coreset may include a common sequence for the coreset.

48 Claims, 15 Drawing Sheets

(51) Int. Cl.
  *H04L 25/02* (2006.01)
  *H04L 1/00* (2006.01)
  *H04B 7/0413* (2017.01)

(52) U.S. Cl.
  CPC ....... *H04W 72/0406* (2013.01); *H04B 7/0413* (2013.01); *H04L 1/0038* (2013.01); *H04L 25/0202* (2013.01); *H04W 72/042* (2013.01)

(56) References Cited

U.S. PATENT DOCUMENTS

| | | | | |
|---|---|---|---|---|
| 2018/0288747 | A1* | 10/2018 | Sun | H04L 5/0007 |
| 2018/0288749 | A1* | 10/2018 | Sun | H04W 72/042 |
| 2018/0368116 | A1* | 12/2018 | Liao | H04W 76/27 |
| 2019/0103941 | A1* | 4/2019 | Seo | H04L 1/00 |

OTHER PUBLICATIONS

Hamidi-Sepehr et al., "5G NR PDCCH: Design and Performance", Jul. 9-11, 2018, 2018 IEEE 5G World Forum (Year: 2018).*

Ericsson: "Overview of DL Control Channel Design", 3GPP Draft; R1-1709062, vol. RAN WG1, no. Hangzhou, China; May 15, 2017-May 19, 2017 May 14, 2017, XP051274220, Retrieved from the Internet: URL:http://www.3gpp.org/ftp/Meetings_3GPP_SYNC/RAN1/Docs/ [retrieved on May 14, 2017], 10 pages.

Intel Corporation: "CORESETs for NR PDCCH", 3GPP Draft; R1-1710543, vol. RAN WG1, No. Qingdao, P.R. China; Jun. 27, 2017-Jun. 30, 2017 Jun. 26, 2017, XP051299750, Retrieved from the Internet: URL:http://www.3gpp.org/ftp/Meetings_3GPP_SYNC/RAN1/Docs/ [retrieved on Jun. 26, 2017], 5 pages.

International Search Report and Written Opinion—PCT/US2018/039023—ISA/EPO—dated Sep. 27, 2018 (175080WO).

Samsung: "DMRS Structure for PDCCH", 3GPP Draft; R1-1711583, DMRS Structure for PDCCH, 3rd Generation Partnership Project (3GPP), Mobile Competence Centre; 650, Route Des Lucioles; F-06921 Sophia-Antipolis Cedex; France, vol. RAN WG1, no. Qingdao, P.R. China; Jun. 27, 2017-Jun. 30, 2017, Jun. 23, 2017 (Jun. 23, 2017), XP051305839, 6 pages, Retrieved from the Internet: URL: http://www.3gpp.org/ftp/tsg_ran/WG1_RL1/TSGR1_AH/NR_AH_1706/Docs/ [retrieved on-Jun. 23, 2017].

* cited by examiner

COMMON REFERENCE SIGNALS FOR MULTIPLE SEARCH SPACES WITHIN A CONTROL RESOURCE SET

CROSS REFERENCES

The present application for patent claims the benefit of U.S. Provisional Patent Application No. 62/525,611 by LEE, et al., entitled "COMMON REFERENCE SIGNALS FOR MULTIPLE SEARCH SPACES WITHIN A CONTROL RESOURCE SET," filed Jun. 27, 2017, assigned to the assignee hereof, and expressly incorporated herein by reference in its entirety.

BACKGROUND

The following relates generally to wireless communication and more specifically to common reference signals for multiple search spaces within a control resource set (coreset).

Wireless communications systems are widely deployed to provide various types of communication content such as voice, video, packet data, messaging, broadcast, and so on. These systems may be capable of supporting communication with multiple users by sharing the available system resources (e.g., time, frequency, or power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). In some cases, a base station may transmit control information to a UE in a control resource set (coreset) to configure the UE for communications with the base station. In such cases, it may be appropriate for the base station to transmit common control information to a group of UEs including the UE in a common search space (CSS) and UE-specific control information to the UE in a UE-specific search space (USS). However, the base station may have to configure multiple coresets in order to transmit the common control information and the UE-specific control information, which may cause increased signaling overhead in a wireless communications system.

SUMMARY

In some wireless communications systems, a base station may transmit control information to a user equipment (UE) in a control resource set (coreset) of a transmission time interval (TTI). The base station may transmit common control information in a common search space (CSS) of the coreset and UE-specific control information in a UE-specific search space (USS) of the same coreset. In addition, the base station may transmit reference signals in the coreset to allow a UE to perform channel estimation to correctly decode control information in the CSS and USS of the coreset. In some examples, the base station may encode or scramble the reference signals transmitted in the CSS and USS of the coreset using a common sequence for the coreset. Such common sequence may include an identifier, for example a type of radio network temporary identifier (RNTI). Accordingly, a UE may be able to demodulate, decode, or descramble the reference signals in the coreset based on a common sequence for the coreset, and the UE may be able to perform channel estimation to correctly decode or demodulate the control information in the CSS and USS of the coreset.

A method for wireless communication is described. The method may include identifying, at a base station, a coreset for a TTI, the coreset including a CSS and a USS, identifying reference signals to transmit in the CSS and the USS of the coreset, the identified reference signals including a common sequence for the coreset, and transmitting the identified reference signals in the CSS and the USS of the coreset.

An apparatus for wireless communication is described. The apparatus may include means for identifying, at a base station, a coreset for a TTI, the coreset including a CSS and a USS, means for identifying reference signals to transmit in the CSS and the USS of the coreset, the identified reference signals including a common sequence for the coreset, means for transmitting the identified reference signals in the CSS and the USS of the coreset.

Another apparatus for wireless communication is described. The apparatus may include a processor, memory in electronic communication with the processor, and instructions stored in the memory. The instructions may be operable to cause the processor to identify, at a base station, a coreset for a TTI, the coreset including a CSS and a USS, identify reference signals to transmit in the CSS and the USS of the coreset, the identified reference signals including a common sequence for the coreset, and transmit the identified reference signals in the CSS and the USS of the coreset.

A non-transitory computer readable medium for wireless communication is described. The non-transitory computer-readable medium may include instructions operable to cause a processor to identify, at a base station, a coreset for a TTI, the coreset including a CSS and a USS, identify reference signals to transmit in the CSS and the USS of the coreset, the identified reference signals including a common sequence for the coreset, and transmit the identified reference signals in the CSS and the USS of the coreset.

Some examples of the method, apparatus, and non-transitory computer-readable medium described above may further include processes, features, means, or instructions for transmitting an indication of a configuration of the coreset in a physical broadcast channel (PBCH) or a radio resource control (RRC) message. Some examples of the method, apparatus, and non-transitory computer-readable medium described above may further include processes, features, means, or instructions for identifying the common sequence for the coreset, where the commons sequence may be based at least in part on a radio network temporary identifier.

Some examples of the method, apparatus, and non-transitory computer-readable medium described above may further include processes, features, means, or instructions for precoding the coreset, including the reference signals, using a same precoder. Some examples of the method, apparatus, and non-transitory computer-readable medium described above may further include processes, features, means, or instructions for precoding the coreset, including the reference signals, using a contiguous precoder. Some examples of the method, apparatus, and non-transitory computer-readable medium described above may further include processes, features, means, or instructions for precoding each control channel element (CCE) of a plurality of CCEs of the coreset, including the identified reference signals, using one of a plurality of different precoders. Some examples of the method, apparatus, and non-transitory computer-readable medium described above may further include processes, features, means, or instructions for precoding a plurality of resource element groups (REGs) of a CCE of the coreset, including the identified reference signals, using one of a plurality of different precoders for each of the plurality of REGs.

In some examples of the method, apparatus, and non-transitory computer-readable medium described above, the coreset spans one or more symbols, the reference signals transmitted in the one or more symbols of the coreset. In some examples of the method, apparatus, and non-transitory computer-readable medium described above, the CSS may have a first aggregation level, and the USS may have a second aggregation level different than the first aggregation level. Some examples of the method, apparatus, and non-transitory computer-readable medium described above may further include processes, features, means, or instructions for precoding the reference signals within a resource element group (REG) bundle of a plurality of REG bundles of the coreset using a same precoder or a contiguous precoder. In some examples of the processes, features, means, or instructions for precoding the reference signals within each REG bundle of the plurality of REG bundles of the coreset may include processes, features, means, or instructions for precoding the reference signals within a first REG bundle of the plurality of REG bundles using a first precoder, and precoding the reference signals within a second REG bundle of the plurality of REG bundles using a second precoder different from the first precoder. Some examples of the method, apparatus, and non-transitory computer-readable medium described above may further include processes, features, means, or instructions for precoding the reference signals across the coreset using a same precoder or a contiguous precoder.

A method of wireless communication is described. The method may include identifying a configuration for coresets, each coreset including a CSS and a USS, receiving a coreset during a TTI, identifying reference signals in the CSS and the USS of the received coreset, the identified references signals including a common sequence for the coreset, and decoding the CSS and the USS based at least in part on the identified reference signals.

An apparatus for wireless communication is described. The apparatus may include means for identifying a configuration for coresets, each coreset including a CSS and a USS, means for receiving a coreset during a TTI, means for identifying reference signals in the CSS and the USS of the received coreset, the identified references signals including a common sequence for the coreset, and means for decoding the CSS and the USS based at least in part on the identified reference signals.

Another apparatus for wireless communication is described. The apparatus may include a processor, memory in electronic communication with the processor, and instructions stored in the memory. The instructions may be operable to cause the processor to identify a configuration for coresets, each coreset including a CSS and a USS, receive a coreset during a TTI, identify reference signals in the CSS and the USS of the received coreset, the identified references signals including a common sequence for the coreset, and decode or demodulate the CSS and the USS based at least in part on the identified reference signals.

A non-transitory computer readable medium for wireless communication is described. The non-transitory computer-readable medium may include instructions operable to cause a processor to identify a configuration for coresets, each coreset including a CSS and a USS, receive a coreset during a TTI, identify reference signals in the CSS and the USS of the received coreset, the identified references signals including a common sequence for the coreset, and decoding the CSS and the USS based at least in part on the identified reference signals.

Some examples of the method, apparatus, and non-transitory computer-readable medium described above may further include processes, features, means, or instructions for receiving an indication of the configuration of the coreset in a PBCH or an RRC message. In some examples of the method, apparatus, and non-transitory computer-readable medium described above, decoding the identified reference signals based at least in part on an RNTI.

Some examples of the method, apparatus, and non-transitory computer-readable medium described above may further include processes, features, means, or instructions for performing channel estimation on a channel based at least in part on the decoded reference signals, the channel carrying the received coreset. Some examples of the method, apparatus, and non-transitory computer-readable medium described above may further include processes, features, means, or instructions for decoding control information in the CSS and the USS based at least in part on performing channel estimation on the channel. In some examples of the method, apparatus, and non-transitory computer-readable medium described above, the coreset spans one or more symbols, the reference signals received in the one or more symbols of the coreset.

DETAILED DESCRIPTION

In some wireless communications systems, a base station may transmit control information to a UE in a control resource set (coreset) of a transmission time interval (TTI) to configure the UE for communications with the base station (e.g., in the TTI). The base station may also transmit reference signals in the coreset to allow the UE to perform channel estimation to correctly decode the control information in the coreset. In some aspects, the base station may transmit common control information in a common search space (CSS) of the coreset and UE-control information in a UE-specific search space (USS) of the coreset. Accordingly, a UE may decode the CSS and a particular USS (i.e., corresponding to the UE) in the coreset to identify control information for communications with the base station.

In some cases, however, it may be challenging and result in increased signaling overhead for the base station to include a CSS and a USS in the same coreset. As described herein, a wireless communications system may support efficient techniques for including the CSS and the USS in the same coreset. Specifically, the base station may encode or scramble the reference signals transmitted in the coreset using a common sequence for the coreset. Accordingly, a receiving UE may also be able to decode or demodulate the CSS and the USS based at least in part on the identified reference signals, or descramble the reference signals based on a descrambling sequence common to the CSS and USS of the coreset. Thus, the UE may perform channel estimation to successfully decode or demodulate the common control information and the UE-specific control information included in the CSS and USS of the coreset.

Aspects of the disclosure introduced above are described below in the context of a wireless communications system. Examples of processes and signaling exchanges that support common reference signals for multiple search spaces within a coreset are then described. Aspects of the disclosure are further illustrated by and described with reference to apparatus diagrams, system diagrams, and flowcharts that relate to common reference signals for multiple search spaces within a coreset.

Figure 1:
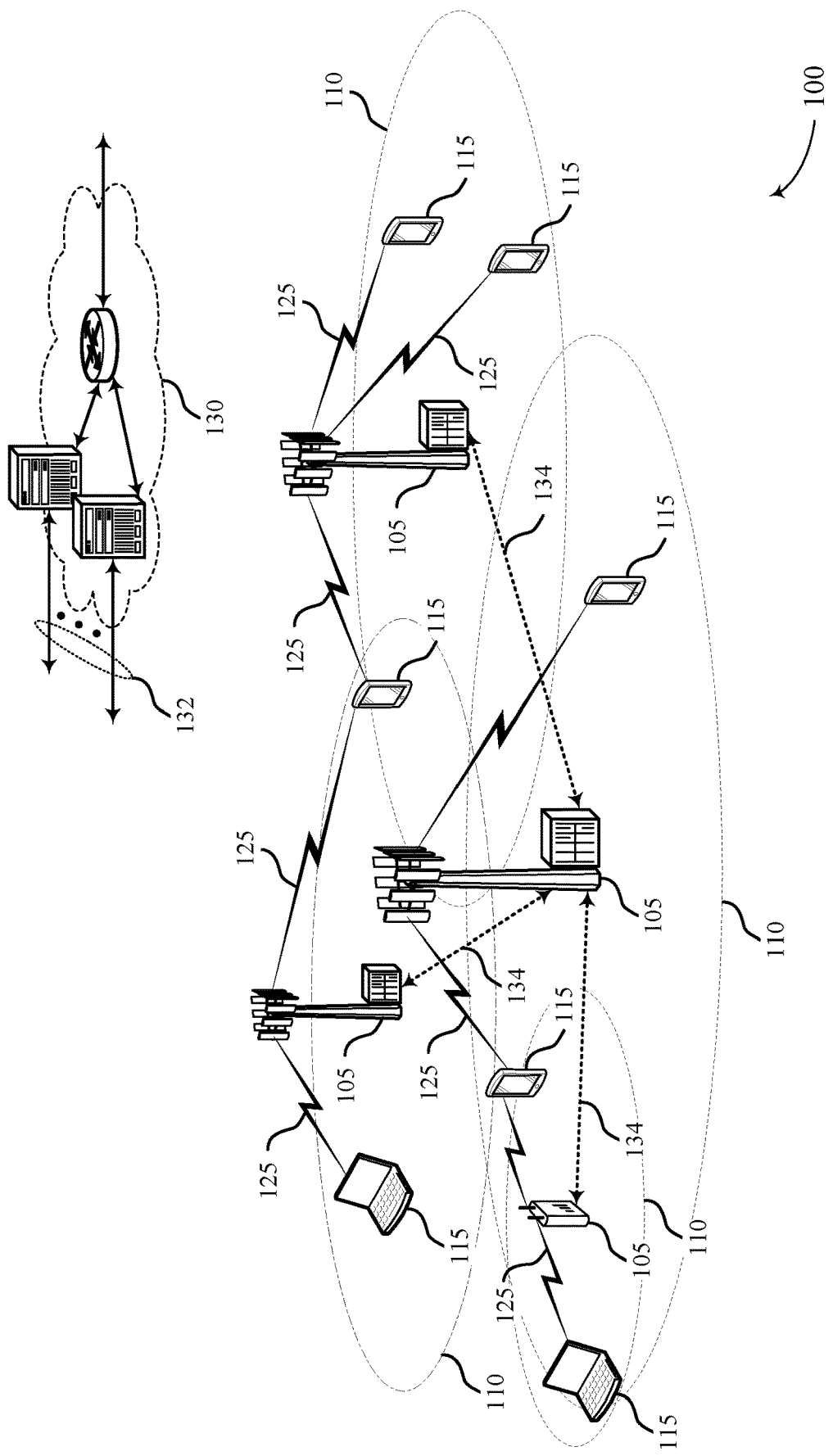
FIG. 1 illustrates an example of a wireless communications system that supports common reference signals for multiple search spaces within a coreset in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

The communication links 125 between a UE 115 and base station 105 may be or represent an organization of physical resources, such as time and frequency resources. A basic unit of time and frequency may be referred to as a resource element. A resource element may consist of one symbol period and one subcarrier (e.g., a 15 KHz frequency range). In some wireless communications systems (e.g., LTE systems), a resource block may include 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. In other wireless communications systems (e.g., low latency systems such as wireless communications system 100), a resource block may include 12 consecutive subcarriers in the frequency domain and one (1) symbol in the time domain, or 12 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals (e.g., downlink control information (DCI) and data) from the base station 105. In some wireless communications systems (e.g., LTE), a subframe may be the basic unit of scheduling or TTI. In other cases, such as with low latency operation, a different, reduced-duration TTI (e.g., an sTTI) may be used. Wireless communications system 100 may employ various TTI durations.

A base station 105 may transmit control information to a UE 115 in a coreset of a TTI. The coreset may include one or more control channel elements (CCEs) that may include control information for the UE 115. A CCE may consist of multiple (e.g., 6) resource element groups (REGs), which may each include one resource block spanning 12 subcarriers within one OFDM symbol. In some cases, a CCE may be defined by six (6) REGs irrespectively of the existence of reference signals within each REG. In some cases, the number of CCEs within a coreset (i.e., the aggregation level) may be configured by base station 105 based on the amount of control information to be transmitted in the coreset, the quality of a channel that includes the coreset, etc. In some examples, base station 105 may use an aggregation level of one (1), two (2), four (4), or eight (8) for control transmissions to UE 115 in a coreset.

In some cases, the number of symbols allocated for control signaling in a coreset (e.g., 1, 2, or 3 symbols) may be configured by higher layer signaling. In some examples, if the coreset spans a single symbol, the REGs within the coreset may be mapped to CCEs within the coreset in the frequency domain first, followed by the time domain (e.g., frequency first CCE-to-REG mapping). In such examples, a first set of consecutive REGs (e.g., consecutive in the frequency domain) may be mapped to a first CCE, a second set of consecutive REGs may be mapped to a second CCE, and so forth. In other examples, if the coreset spans multiple symbols, the REGs within the coreset may be mapped to CCEs within the coreset in the time domain first, followed by the frequency domain (e.g., time first CCE-to-REG mapping). In such examples, a set of REGs across the multiple symbols at a first frequency may be mapped to a CCE in order of the symbols associated with each REG, and, after all REGs at the first frequency are mapped to the CCE, REGs at a second frequency may be mapped to the CCE in order of the symbols associated with each REG.

In wireless communications system 100, it may be appropriate for a base station 105 to transmit common control information to a group of UEs 115 and UE-specific control information to a specific UE 115. As such, the base station 105 may transmit the common control information in a CSS of one coreset, and the base station 105 may transmit the UE-specific control information in a USS of another coreset. In such cases, however, the base station 105 may have to use additional signaling to indicate to a UE 115 the properties of the multiple coresets, which may result in increased overhead in a wireless communications system. Wireless communications system 100 may support efficient techniques that allow a base station 105 to include a CSS and a USS in the same coreset to reduce the overhead in the system.

Figure 2:
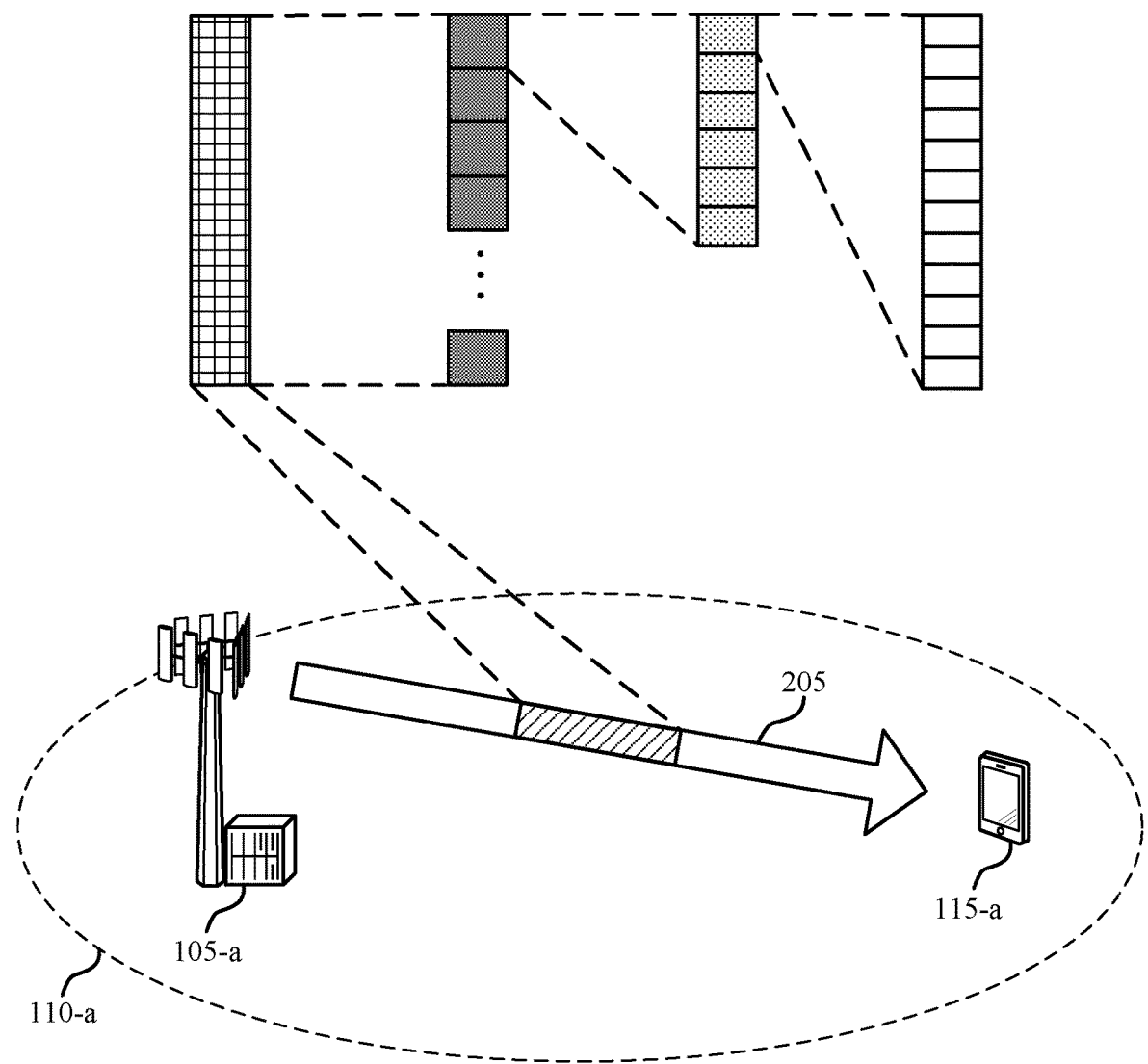
FIG. 2 illustrates an example of a wireless communications system that supports common reference signals for multiple search spaces within a coreset in accordance with various aspects of the present disclosure.
Figure 2:
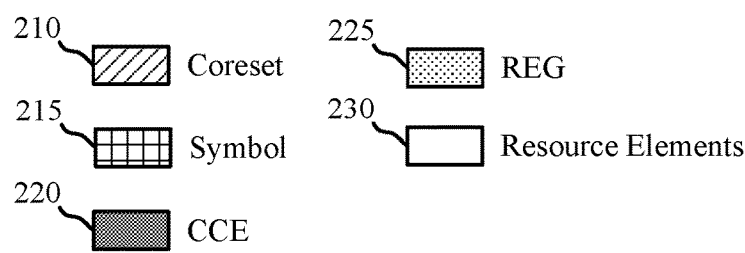

FIG. 2 illustrates an example of a wireless communications system 200 that supports common reference signals for multiple search spaces within a coreset in accordance with various aspects of the present disclosure. Wireless communications system 200 includes base station 105-a and UE 115-a, which may be examples of a base station 105 and a UE 115 described with reference to FIG. 1. Base station 105-a may provide communication coverage for a coverage area 110-a and may communicate with UE 115-a on resources (e.g., time-frequency resources) of a carrier 205. In the example of FIG. 2, base station 105-a may transmit control information to UE 115-a in a coreset 210 on carrier 205.

In some examples, base station 105-a may configure coreset 210 for control signaling to UE 115-a during an initial access procedure with UE 115-a (e.g., using a physical broadcast channel (PBCH)) or when UE 115-a is synchronized with and connected to base station 105-a (e.g., using an RRC signaling). As described with reference to FIG. 1, coreset 210 may span one or more symbols (e.g., 1, 2, or 3 symbols), and the number of symbols spanned by coreset 210 may be configured by base station 105-a using higher layer signaling. In the example of FIG. 2, coreset 210 spans one (1) symbol 215. Symbol 215 of coreset 210 may include multiple CCEs 220 which may each include a fixed number of REGs 225 (e.g., six (6)) or may include a variable number of REGs 225. Each REG 225 may include one (1) resource block that contains 12 resource elements 230.

In some cases, base station 105-a may transmit control information in some of the resource elements 230 within a CCE 220, and base station 105-a may transmit reference signals in the other resource elements 230 within the CCE 220. UE 115-a may receive the reference signals and use these signals to perform channel estimation to correctly decode or demodulate the control information in the CCE 220. In some aspects, UE 115-a may be configured to decode or demodulate the coreset 210 using a single port (i.e., transparent to any transmit diversity). The density and pattern of the reference signals within a symbol of a coreset may vary for different coresets or may be predefined for all coresets in wireless communications system 200. In one example, half of the resource elements 230 in each symbol of a coreset 210 may include reference signals (e.g., a 50% overhead), and the reference signals may be mapped to every other resource element. In another example, all reference signals in coreset 210 may be mapped to a first symbol in coreset 210 (e.g., for front-loaded reference signal mapping).

In some cases, it may be appropriate for base station 105-a to transmit common control information (e.g., to a group of UEs 115 including UE 115-a) and UE-specific control information to UE 115-a. As such, base station 105-a may transmit the common control information in a CSS of a coreset, and base station 105-a may transmit the UE-specific control information in a USS of another coreset. In order to configure the two coresets, base station 105-a may have to signal to UE 115-a the properties of each of the two coresets. However, the use of such signaling to configure multiple coresets may increase overhead in a wireless communications system. Additionally, in some wireless communications systems (e.g., mmW systems), a base station 105-a may not have access to sufficient resources to configure multiple coresets. Thus, to reduce the overhead of coresets used for control signaling in wireless communications system 200, base station 105-a may support efficient techniques for including a CSS and a USS in the same coreset 210.

Figure 3:
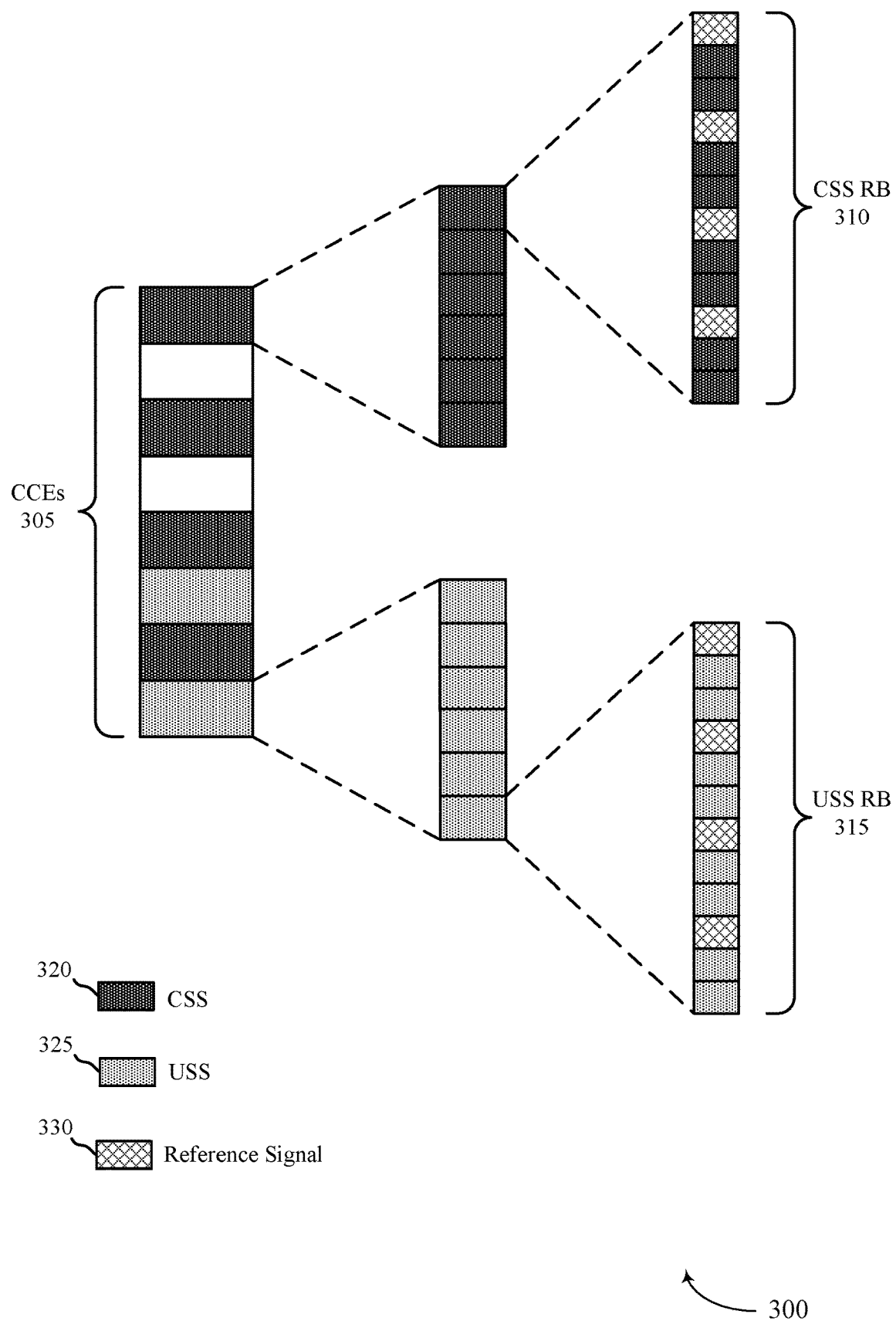
FIGS. 3 and 4 illustrate examples of coresets in a system that supports common reference signals for multiple search spaces within a coreset in accordance with various aspects of the present disclosure.

FIG. 3 illustrates an example of a coreset 300 in a system that supports common reference signals for multiple search spaces within a coreset in accordance with various aspects of the present disclosure. Coreset 300 may span one symbol and may be an example of coreset 210 described with reference to FIG. 2. Further, coreset 300 may include a number of CCEs 305, which may be examples of CCEs 220 described with reference to FIG. 2. As described with reference to FIGS. 1 and 2, CCEs 305 may include multiple REGs which may each include 12 resource elements.

As described herein, base station 105-a may support efficient techniques for including a CSS 320 and a USS 325 in coreset 300. Accordingly, base station 105-a may transmit common control information in CSS 320 of coreset 300, and base station 105-a may transmit UE-specific control information (e.g., to UE 115-a) in USS 325 of coreset 300. In the example of FIG. 3, base station 105-a may transmit common control information in CSS 320 with an aggregation level of four (4), and base station 105-a may transmit UE-specific control information in USS 325 with an aggregation level of two (2). In other examples, however, the aggregation level used for CSS transmissions and USS transmissions may vary.

In order to ensure that UE 115-a is able to correctly decode or demodulate the control information in CSS 320 and USS 325 transmitted in the same coreset 300, base station 105-a may transmit common reference signals 330 in CSS 320 and USS 325 of the coreset 300. That is, base station 105-a may encode or scramble the reference signals 330 transmitted in CSS 320 (e.g., CSS resource block 310) and the reference signals 330 transmitted in USS 325 (e.g., USS resource block 315) using a common sequence (e.g., using a radio network temporary identifier (RNTI), such as a cell RNTI (C-RNTI)) for the coreset. Accordingly, UE 115-*a* may be able to decode or demodulate the CSS and the USS based at least in part on the identified reference, or descramble the reference signals transmitted in CSS 320 and USS 325 based on the common sequence, and UE 115-*a* may be able to perform channel estimation for the channel that includes the coreset 300 to correctly decode or demodulate the control information in CSS 320 and USS 325.

In addition, in some cases, base station 105-*a* may precode the reference signals 330 transmitted to UE 115-*a* within coreset 300 using a same or a contiguous precoder. In some instances, a contiguous precoder may be a type of precoder to implement precoding for cyclic delay diversity. In such cases, the reference signals 330 transmitted in coreset 300 may be referred to as wideband reference signals. Since UE 115-*a* may be configured with a single port for decoding the coreset 300 (e.g., as described with reference to FIG. 2), UE 115-*a* may be able to correctly decode or demodulate the reference signals 330 in the coreset. Thus, UE 115-*a* may be able to perform channel estimation accurately based on the reference signals. However, because the reference signals 330 may be precoded using the same or contiguous precoder, there may be no diversity in the transmission of the reference signals.

In other cases, base station 105-*a* may precode the reference signals 330 transmitted in different CCEs, different REG bundles, or different groups of REG bundles within coreset 300 using different precoders. As such, UE 115-*a* may assume the base station 105-*a* precoded the reference signals within the coreset 300 within a REG bundle using a same or contiguous precoder. In such cases, the reference signals 330 transmitted in coreset 300 may be referred to as narrowband reference signals. Because the reference signals 330 in each of the CCEs, REG bundles, or groups of REG bundles may be precoded using a different precoder, there may be increased diversity in the transmission of the reference signals (e.g., increased transmit diversity). However, since UE 115-*a* may be configured with a single port for decoding the coreset 300 (e.g., as described with reference to FIG. 2), UE 115-*a* may not be able to accurately perform channel estimation and, as a result, UE 115-*a* may experience some decoding errors.

Figure 4:
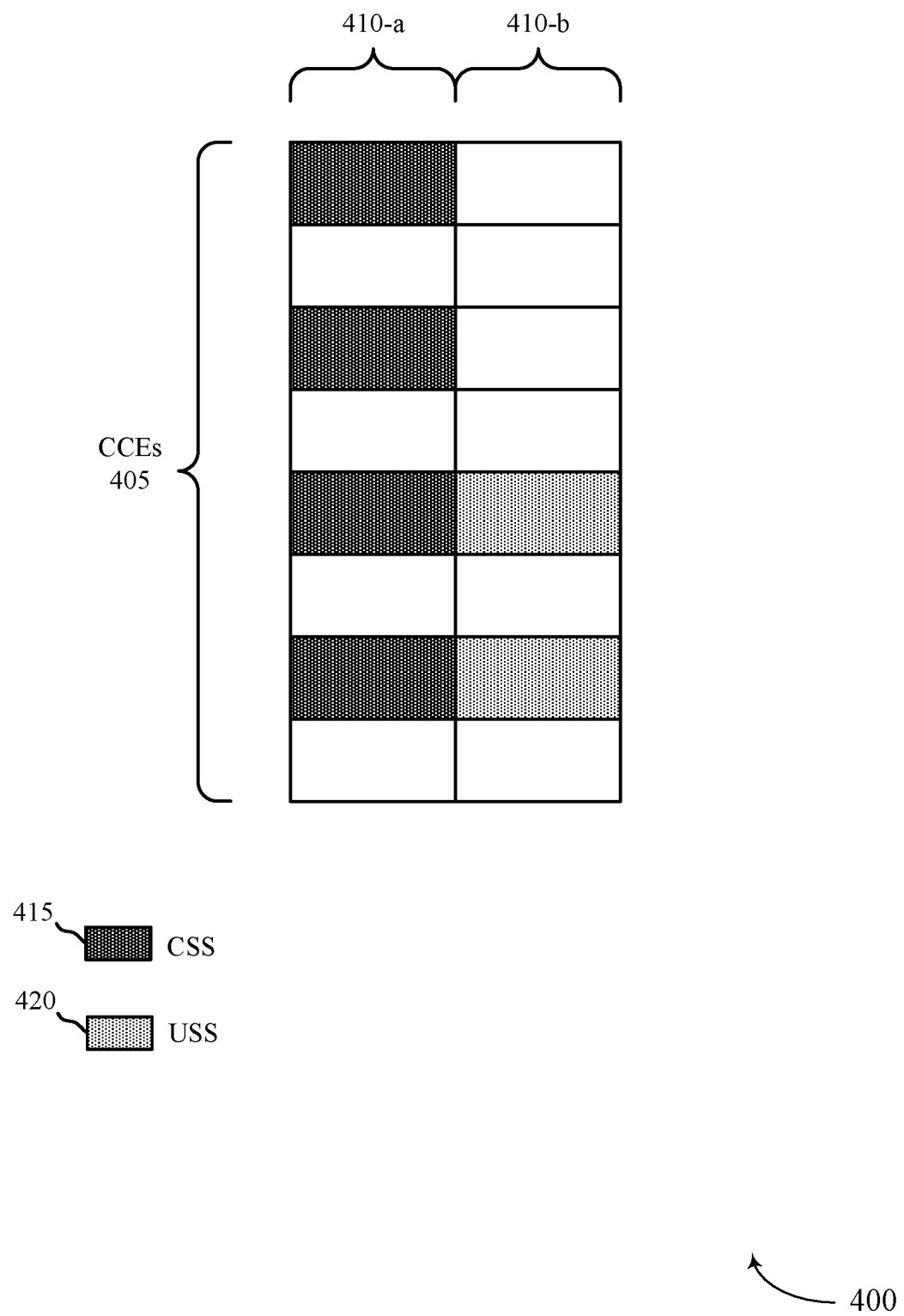

FIG. 4 illustrates an example of a coreset 400 in a system that supports common reference signals for multiple search spaces within a coreset in accordance with various aspects of the present disclosure. Coreset 400 may span two symbols (symbol 410-*a* and 410-*b*) and may include a number of CCEs 405 which may each include multiple REGs. As described herein, base station 105-*a* may support efficient techniques for including a CSS 415 and a USS 420 in coreset 400. Accordingly, base station 105-*a* may transmit common control information in CSS 415 of coreset 400, and base station 105-*a* may transmit UE-specific control information (e.g., to UE 115-*a*) in USS 420 of coreset 400. In the example of FIG. 4, base station 105-*a* may transmit common control information in CSS 415 with an aggregation level of four (4), and base station 105-*a* may transmit UE-specific control information in USS 420 with an aggregation level of two (2). In other examples, however, the aggregation level used for CSS transmissions and USS transmissions may vary.

As illustrated, in coreset 400, base station 105-*a* may transmit common control information in CSS 415 in a first symbol 410-*a* of the coreset 400, and base station 105-*a* may transmit UE-specific control information in USS 420 in a second symbol 410-*b* of the coreset 400. In order to ensure that UE 115-*a* is able to correctly decode or demodulate the control information in CSS 415 and USS 420 transmitted in the same coreset 400, base station 105-*a* may transmit common reference signals in CSS 415 and USS 420 of the coreset 400. That is, base station 105-*a* may decode the reference signals transmitted in CSS 415 and USS 420 using a common sequence (e.g., using an identifier, such as a C-RNTI, or some other RNTI) for the coreset 400. Accordingly, UE 115-*a* may be able to decode, demodulate, or descramble the reference signals transmitted in CSS 415 and USS 420 based on the common sequence, and UE 115-*a* may be able to perform channel estimation for the channel that includes the coreset 400 to correctly decode or demodulate the control information in CSS 415 and USS 420.

In addition, in some cases, base station 105-*a* may precode the reference signals transmitted to UE 115-*a* within coreset 400 using a same or contiguous precoder. In such cases, the reference signals transmitted in coreset 400 may be referred to as wideband reference signals. In other cases, base station 105-*a* may precode the reference signals transmitted in different CCEs, different REG bundles, or different groups of REG bundles within coreset 400 using different precoders. In such cases, the reference signals transmitted in coreset 400 may be referred to as narrowband reference signals. Once the reference signals are precoded using either of the techniques described above, base station 105-*a* may transmit the reference signals in the first symbol 410-*a*, the second symbol 410-*b*, or both symbols 410. If the reference signals are transmitted in both symbols 410, a receiving UE 115-*a* may perform joint channel estimation across the symbols 410.

Figure 5:
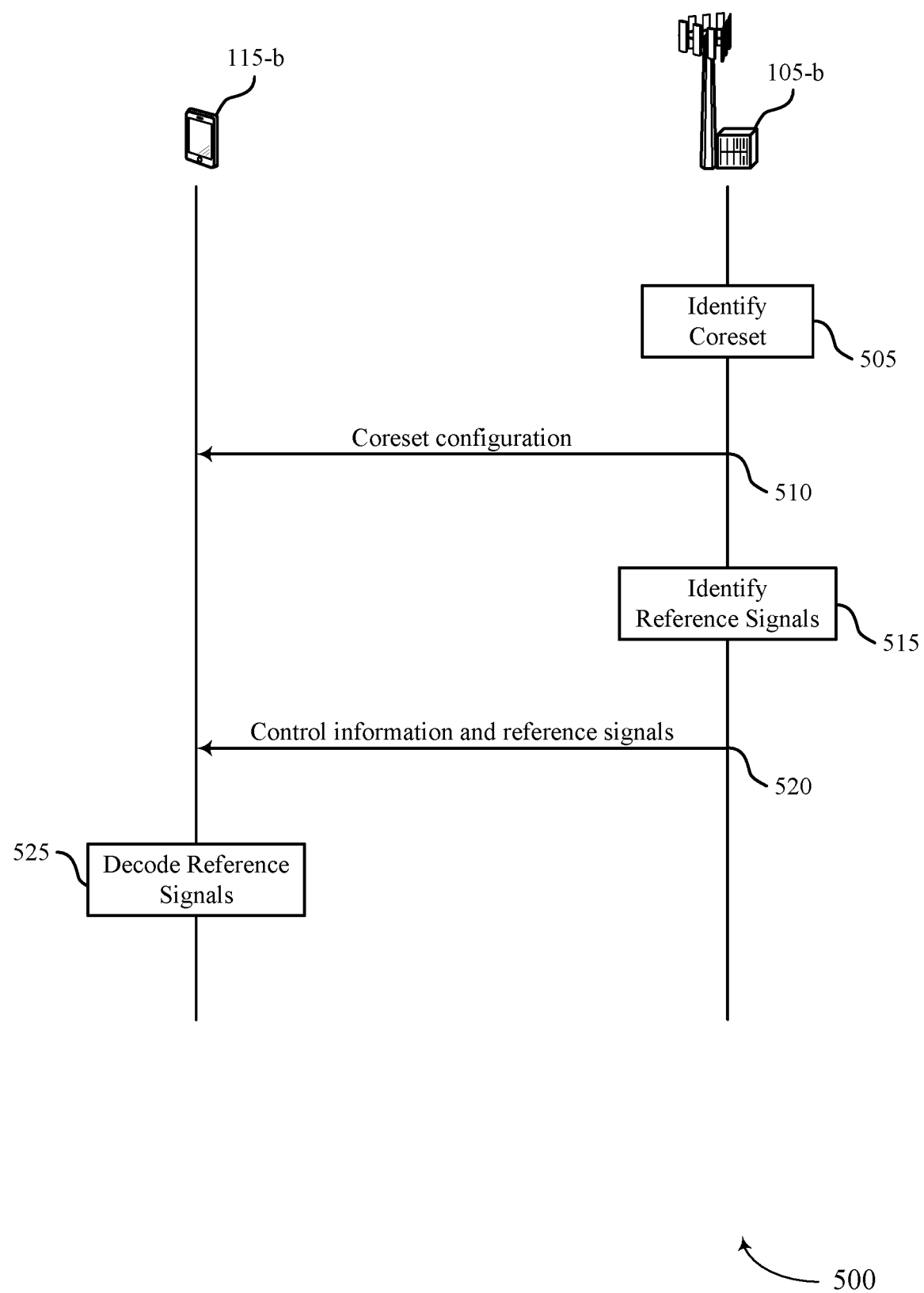
FIG. 5 illustrates an example of a process flow in a system that supports common reference signals for multiple search spaces within a coreset in accordance with various aspects of the present disclosure.

FIG. 5 illustrates an example of a process flow 500 that supports common reference signals for multiple search spaces within a coreset in accordance with various aspects of the present disclosure. Process flow 500 illustrates aspects of techniques performed by a base station 105-*b* and a UE 115-*b*, which may be examples of a base station 105 and a UE 115 described with reference to FIGS. 1-4.

At 505, base station 105-*b* may identify a coreset for a TTI including a CSS and a USS. Base station 105-*b* may then transmit an indication of the configuration of the coreset to UE 115-*b*. In one example, base station 105-*b* may transmit the indication of the configuration of the coreset to UE 115-*b* in a PBCH as part of an initial access procedure. In another example, base station 105-*b* may transmit the indication of the configuration of the coreset to UE 115-*b* in an RRC message when the UE 115-*b* is synchronized with and connected to base station 105-*b*.

At 515, base station 105-*b* may then identify reference signals to transmit in the CSS and the USS of the coreset. In some cases, the identified reference signals may include a common sequence for the coreset. In some cases, base station 105-*b* may encode or scramble the reference signals using a scrambling sequence common to the CSS and the USS. In some cases, the scrambling sequence may be based on an identifier, such as an RNTI (e.g., C-RNTI or some other RNTI). Further, in some cases, the reference signals may include narrowband reference signals or wideband reference signals. For example, the base station 105-*b* may precode the reference signals within a resource element group (REG) bundle of a plurality of REG bundles of the coreset using a same precoder or a contiguous precoder. In some cases, precoding the reference signals within each REG bundle of the plurality of REG bundles of the coreset may include precoding the reference signals within a first REG bundle of the plurality of REG bundles using a second precoder different from the first precoder. Additionally or alternatively, the base station 105-b may precode the reference signals across the coreset using a same precoder or contiguous precoder.

In one example, base station 105-b may precode the coreset, including the reference signals, using a same precoder or a contiguous precoder. In another example, base station 105-b may precode each CCE of a plurality of CCEs of the coreset, including the reference signals, using one of a plurality of different precoders. In yet another example, base station 105-b may precode a plurality of REGs of a CCE of the coreset, including the reference signals, using one of a plurality of different precoders for each of the plurality of REGs.

At 520, base station 105-b may transmit control information and the identified reference signals in the CSS and the USS of the coreset. In some cases, the coreset may span one or more symbols, and the reference signals may be transmitted in the one or more symbols. In some cases, the coreset may span a plurality of symbols, and the reference signals may be transmitted in a subset of the plurality of symbols of the coreset. Further, in some cases, the CSS may have a first aggregation level (e.g., aggregation level 4) and the USS may have a second aggregation level (e.g., aggregation level 2) that is different from the first aggregation level.

UE 115-b may then identify the configuration for the coreset (e.g., based on the coreset configuration received at 510), and UE 115-b may receive the coreset during the TTI. At 525, UE 115-b may identify the reference signals in the CSS and the USS of the received coreset. In some cases, the identified reference signals may include a common sequence for the coreset. In such cases, UE 115-b may decode or demodulate the CSS and the USS based at least in part on the identified reference signals. In some cases, the UE 115-b may descramble the identified reference signals based on a descrambling sequence common to the CSS and the USS.

For example, UE 115-b may decode, demodulate, or descramble the identified reference signals based on an RNTI (e.g., C-RNTI or some other RNTI). UE 115-b may then perform channel estimation on a channel carrying the received coreset based on the decoded, demodulated, or descrambled reference signals, and UE 115-b may decode or demodulate control information in the CSS and the USS based on performing channel estimation on the channel.

Figure 6:
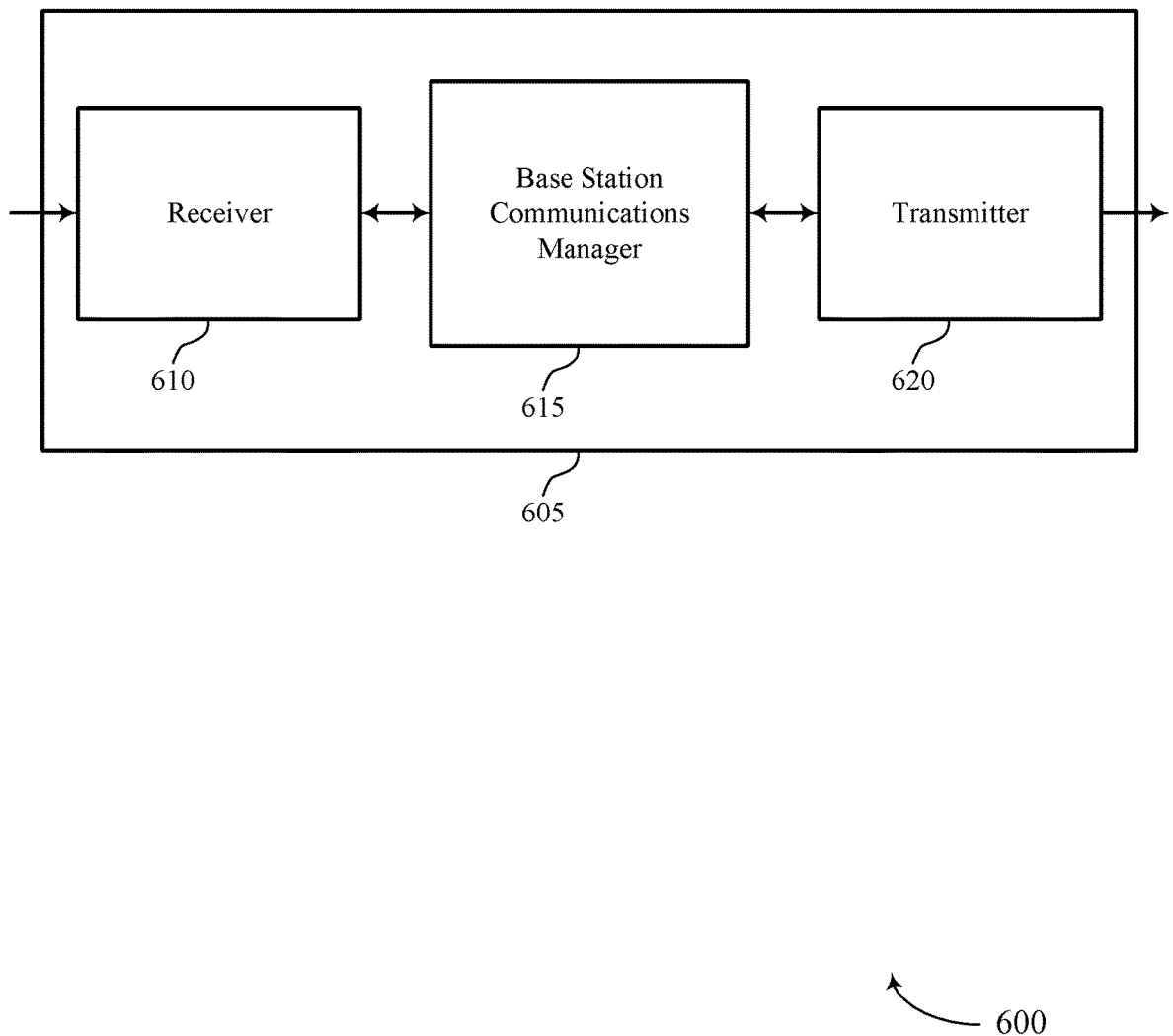
FIGS. 6 through 8 show block diagrams of a device that supports common reference signals for multiple search spaces within a coreset in accordance with various aspects of the present disclosure.

FIG. 6 shows a block diagram 600 of a wireless device 605 that supports common reference signals for multiple search spaces within a coreset in accordance with various aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to common reference signals for multiple search spaces within a coreset, etc.). Information may be passed on to other components of the device. Receiver 610 may be an example of aspects of transceiver 935 described with reference to FIG. 9. Receiver 610 may utilize a single antenna or a set of antennas.

Base station communications manager 615 may be an example of aspects of the base station communications manager 915 described with reference to FIG. 9. Base station communications manager 615 and/or at least some of its various sub-components may be implemented in hardware, software executed by a processor, firmware, or any combination thereof. If implemented in software executed by a processor, the functions of base station communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

Base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may identify a coreset for a TTI, the coreset including a CSS and a USS, identify reference signals to transmit in the CSS and the USS of the coreset, the identified reference signals including a common sequence for the coreset.

Transmitter 620 may transmit signals generated by other components of the device. In some examples, transmitter 620 may be collocated with a receiver 610 in a transceiver module. For example, transmitter 620 may be an example of aspects of the transceiver 935 described with reference to FIG. 9. Transmitter 620 may utilize a single antenna or a set of antennas. In some cases, transmitter 620 may transmit the identified reference signals in the CSS and the USS of the coreset.

Figure 7:
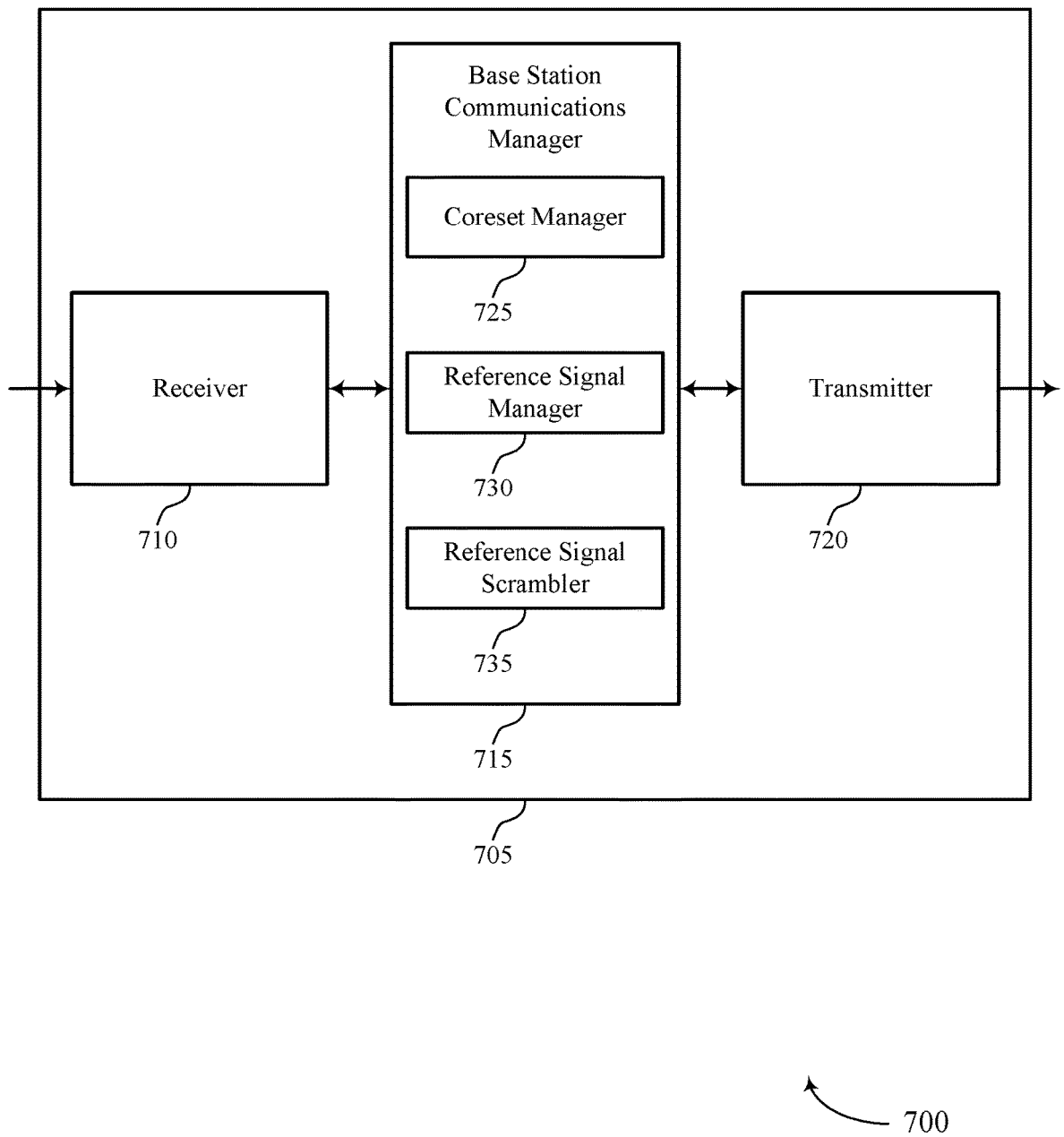

FIG. 7 shows a block diagram 700 of a wireless device 705 that supports common reference signals for multiple search spaces within a coreset in accordance with various aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to common reference signals for multiple search spaces within a coreset, etc.). Information may be passed on to other components of the device. Receiver 710 may be an example of aspects of the transceiver 935 described with reference to FIG. 9. Receiver 710 may utilize a single antenna or a set of antennas.

Base station communications manager 715 may be an example of aspects of the base station communications manager 915 described with reference to FIG. 9. Base station communications manager 715 may include coreset manager 725, reference signal manager 730, and reference signal scrambler 735. Coreset manager 725 may identify, at a base station 105, a coreset for a TTI, the coreset including a CSS and a USS. In some cases, the coreset spans one or more symbols. In some cases, the coreset spans a plurality of symbols, the reference signals transmitted in a subset of the set of symbols of the coreset. In some cases, the CSS has a first aggregation level, and the USS has a second aggregation level different than the first aggregation level.

Reference signal manager 730 may identify reference signals to transmit in the CSS and the USS of the coreset. The identified reference signals may include a common sequence for the coreset. In some cases, the reference signals include narrowband reference signals or wideband reference signals. For example, the base station 105-b may precode the reference signals within a resource element group (REG) bundle of a plurality of REG bundles of the coreset using a same precoder or a contiguous precoder. In some cases, precoding the reference signals within each REG bundle of the plurality of REG bundles of the coreset may include precoding the reference signals within a first REG bundle of the plurality of REG bundles using a second precoder different from the first precoder. Additionally or alternatively, the base station 105-b may precode the reference signals across the coreset using a same precoder or contiguous precoder. Reference signal scrambler 735 may scramble or encode the reference signals using a common sequence for the coreset. In some cases, reference signal scrambler 735 may identify a scrambling sequence common to the CSS and the USS, where the scrambling sequence is based on an RNTI.

Transmitter 720 may transmit signals generated by other components of the wireless device 705. In some examples, transmitter 720 may be collocated with a receiver 710 in a transceiver module. For example, transmitter 720 may be an example of aspects of the transceiver 935 described with reference to FIG. 9. Transmitter 720 may utilize a single antenna or a set of antennas.

Figure 8:
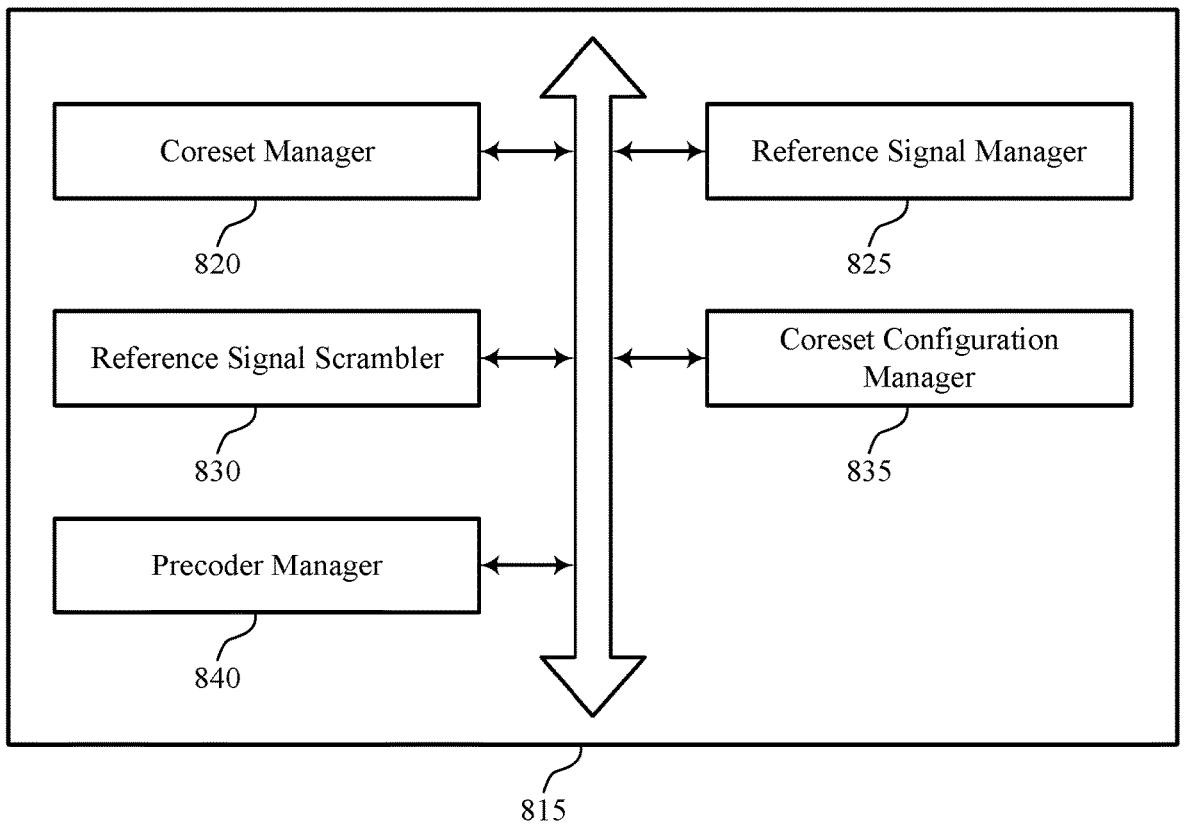

FIG. 8 shows a block diagram 800 of base station communications manager 815 that supports common reference signals for multiple search spaces within a coreset in accordance with various aspects of the present disclosure. Base station communications manager 815 may be an example of aspects of base station communications manager 615, 715, or 915 described with reference to FIGS. 6, 7, and 9. Base station communications manager 815 may include coreset manager 820, reference signal manager 825, reference signal scrambler 830, coreset configuration manager 835, and precoder manager 840. Each of these modules may communicate, directly or indirectly, with one another (e.g., via one or more buses).

Coreset manager 820 may identify, at a base station 105, a coreset for a TTI, the coreset including a CSS and a USS. In some cases, the coreset spans one or more symbols, the reference signals transmitted in the one or more symbols. In some cases, the coreset spans a plurality of symbols, and the reference signals may be transmitted in a subset of the plurality of symbols of the coreset. In some cases, the CSS has a first aggregation level, and the USS has a second aggregation level different than the first aggregation level.

Reference signal manager 825 may identify reference signals to transmit in the CSS and the USS of the coreset. In some cases, the reference signals include narrowband reference signals or wideband reference signals. Reference signal scrambler 830 may scramble the reference signals using a scrambling sequence common to the CSS and the USS. In some cases, reference signal manager 825 may identify the scrambling sequence common to the CSS and the USS, where the scrambling sequence is based on a radio network temporary identifier.

Coreset configuration manager 835 may transmit an indication of a configuration of the coreset in a PBCH or an RRC message. Precoder manager 840 may precode the coreset, including the reference signals, using a same precoder or a contiguous precoder, precode each CCE of a set of CCEs of the coreset, including the reference signals, using one of a set of different precoder, and/or precode a set of REGs of a CCE of the coreset, including the reference signals, using one of a set of different precoder for each of the set of REGs. In some cases, precoder manager 840 may precode the reference signals within a resource element group (REG) bundle of a plurality of REG bundles of the coreset using a same precoder or a contiguous precoder. In some cases, precoding the reference signals within each REG bundle of the plurality of REG bundles of the coreset may include precoding the reference signals within a first REG bundle of the plurality of REG bundles using a second precoder different from the first precoder. Additionally or alternatively, precoder manager 840 may precode the reference signals across the coreset using a same precoder or contiguous precoder.

Figure 9:
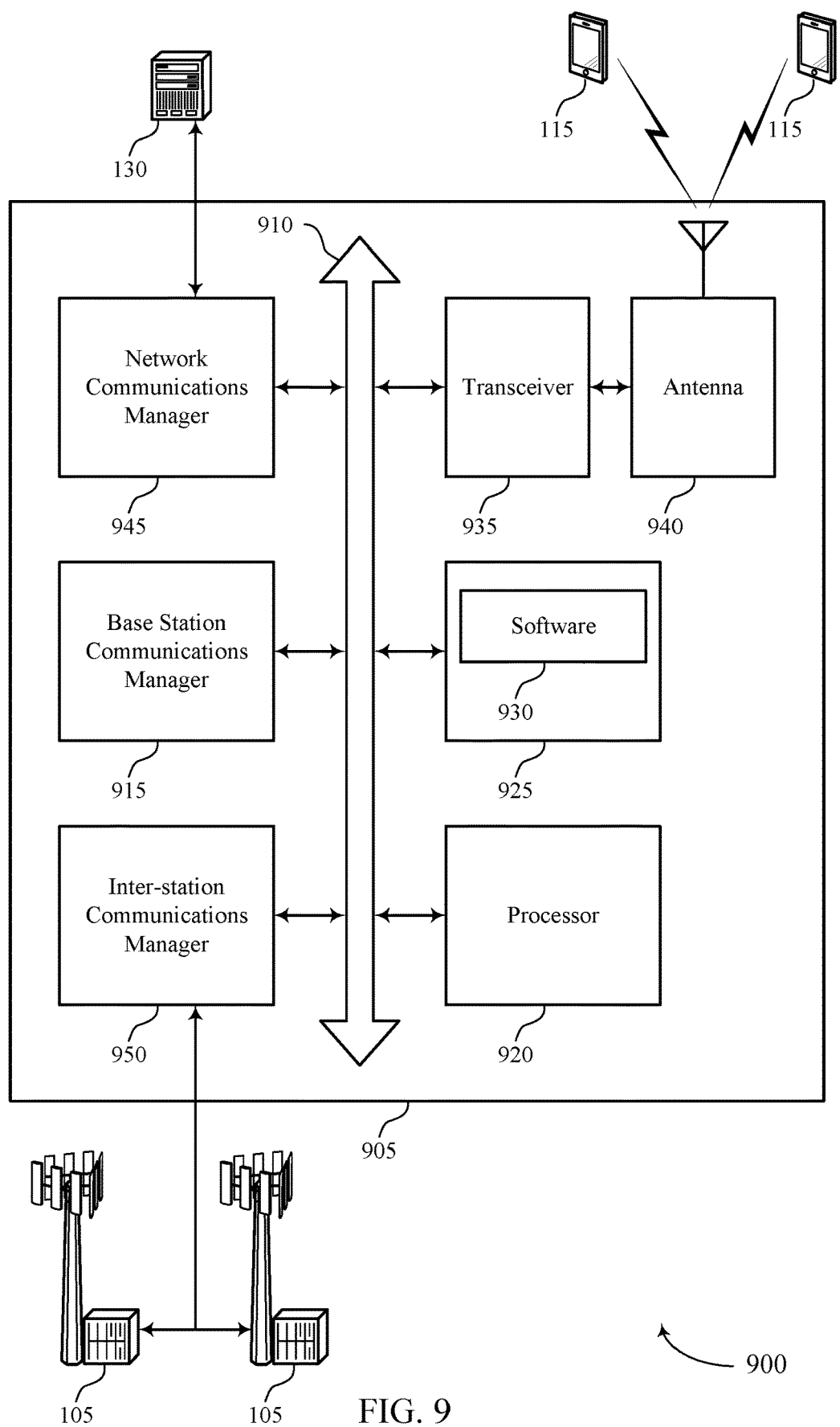
FIG. 9 illustrates a block diagram of a system including a base station that supports common reference signals for multiple search spaces within a coreset in accordance with various aspects of the present disclosure.

FIG. 9 shows a diagram of a system 900 including a device 905 that supports common reference signals for multiple search spaces within a coreset in accordance with various aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting common reference signals for multiple search spaces within a coreset).

Memory 925 may include random access memory (RAM) and read only memory (ROM). Memory 925 may store computer-readable, computer-executable software 930 including instructions that, when executed, cause the processor to perform various functions described herein. In some cases, memory 925 may contain, among other things, a basic input/output system (BIOS) which may control basic hardware or software operation such as the interaction with peripheral components or devices.

Software 930 may include code to implement aspects of the present disclosure, including code to support common reference signals for multiple search spaces within a coreset. Software 930 may be stored in a non-transitory computer-readable medium such as system memory or other memory.

In some cases, software 930 may not be directly executable by the processor but may cause a computer (e.g., when compiled and executed) to perform functions described herein.

Transceiver 935 may communicate bi-directionally, via one or more antennas, wired, or wireless links as described above. For example, transceiver 935 may represent a wireless transceiver and may communicate bi-directionally with another wireless transceiver. Transceiver 935 may also include a modem to modulate the packets and provide the modulated packets to the antennas for transmission, and to demodulate packets received from the antennas. In some cases, the device 905 may include a single antenna 940. However, in some cases the device 905 may have more than one antenna 940, which may be capable of concurrently transmitting or receiving multiple wireless transmissions. Network communications manager 945 may manage communications with the core network (e.g., via one or more wired backhaul links). For example, network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
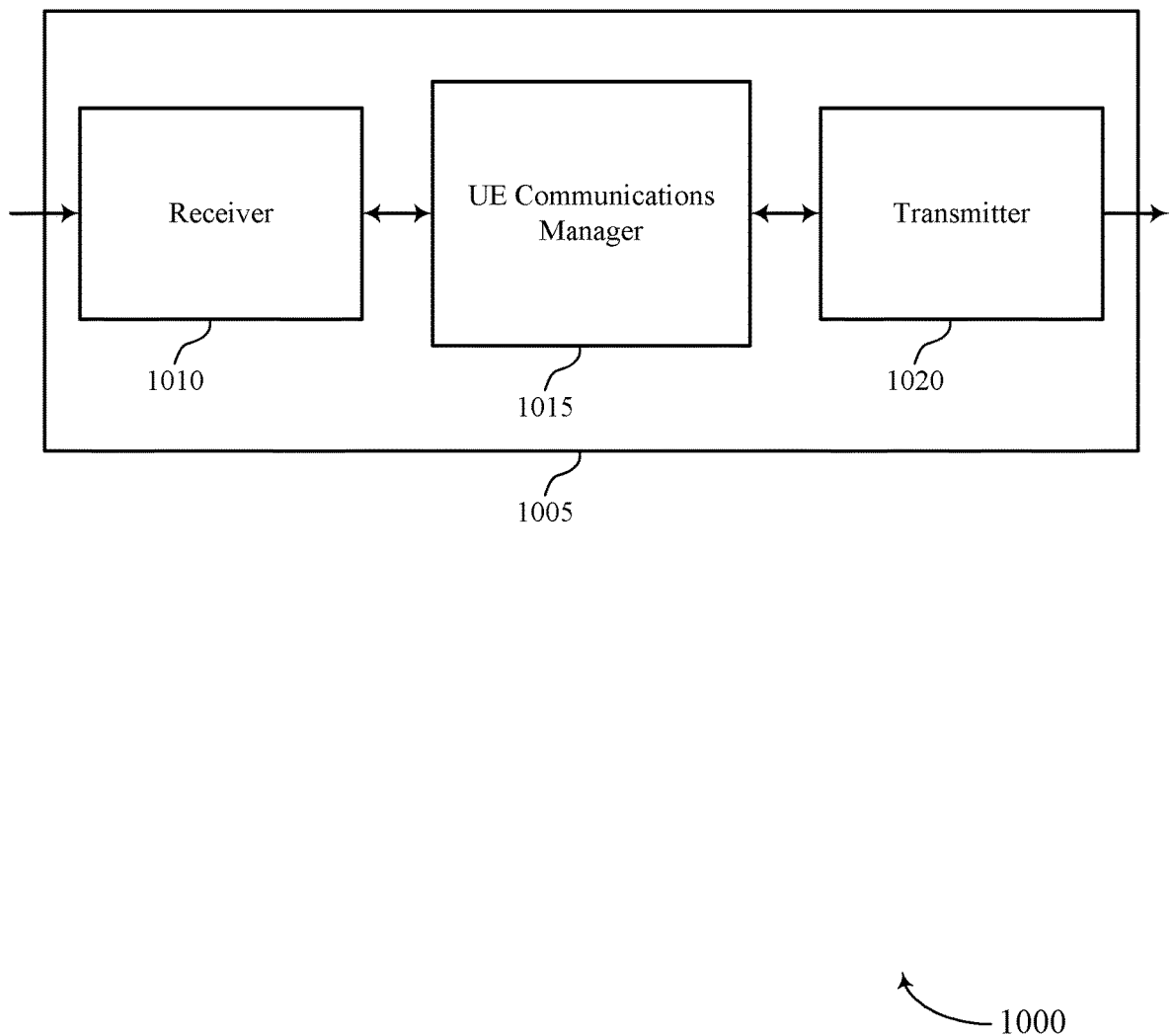
FIGS. 10 through 12 show block diagrams of a device that supports common reference signals for multiple search spaces within a coreset in accordance with various aspects of the present disclosure.

FIG. 10 shows a block diagram 1000 of a wireless device 1005 that supports common reference signals for multiple search spaces within a coreset in accordance with various aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to common reference signals for multiple search spaces within a coreset, etc.). Information may be passed on to other components of the device. Receiver 1010 may be an example of aspects of transceiver 1335 described with reference to FIG. 13. Receiver 1010 may utilize a single antenna or a set of antennas.

UE communications manager 1015 may be an example of aspects of UE communications manager 1315 described with reference to FIG. 13. UE communications manager 1015 and/or at least some of its various sub-components may be implemented in hardware, software executed by a processor, firmware, or any combination thereof. If implemented in software executed by a processor, the functions of UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may identify a configuration for coresets, each coreset including a CSS and a USS, receive a coreset during a TTI, identify reference signals in the CSS and the USS of the received coreset, the identified reference signals including a common sequence for the coreset, and decode or demodulate the CSS and the USS based at least in part on the identified reference signals. In some cases, UE communications manager 1015 may descramble the identified reference signals based on a descrambling sequence common to the CSS and the USS.

Transmitter 1020 may transmit signals generated by other components of the wireless device 1005. In some examples, transmitter 1020 may be collocated with receiver 1010 in a transceiver module. For example, transmitter 1020 may be an example of aspects of the transceiver 1335 described with reference to FIG. 13. Transmitter 1020 may utilize a single antenna or a set of antennas.

Figure 11:
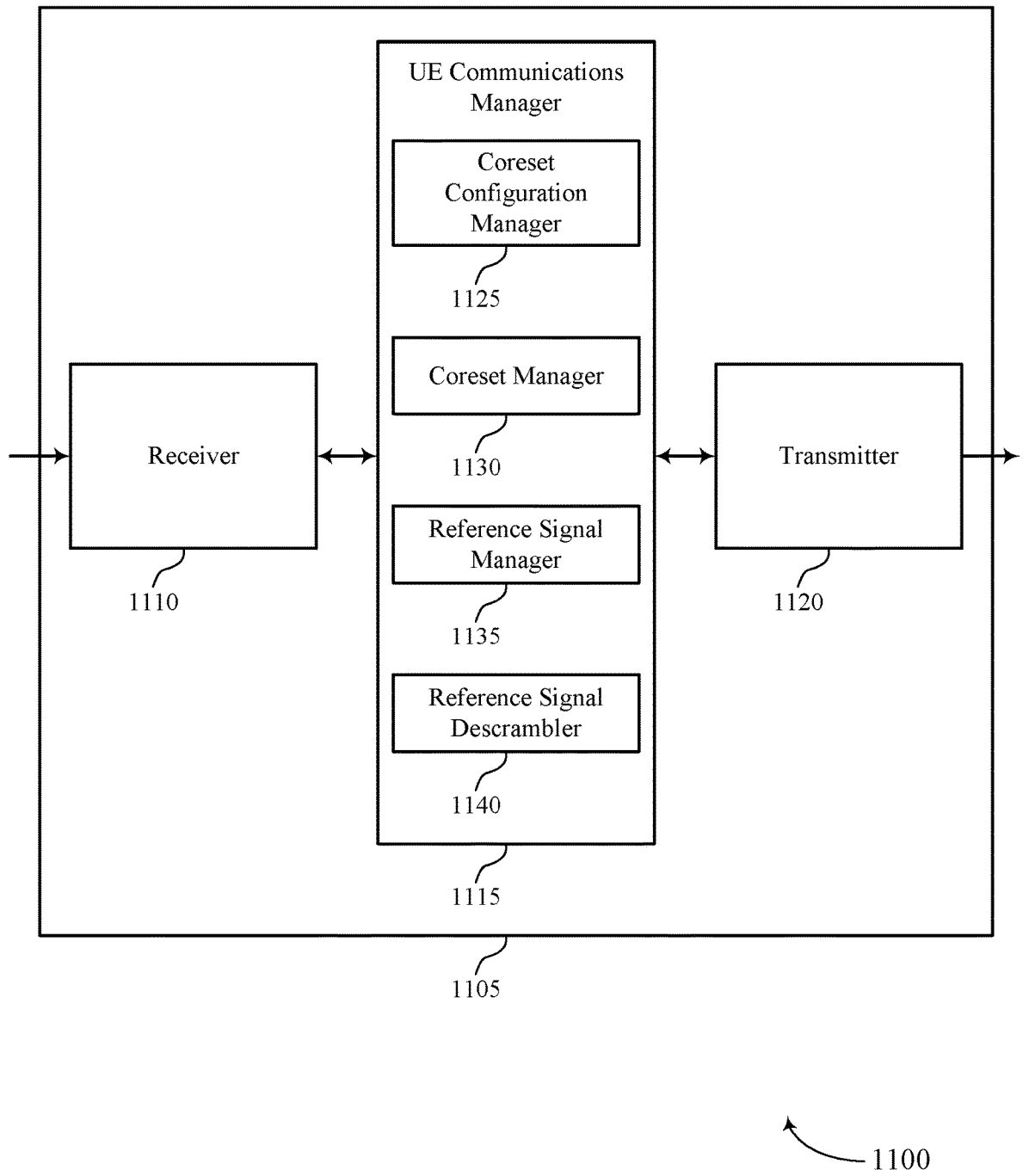

FIG. 11 shows a block diagram 1100 of a wireless device 1105 that supports common reference signals for multiple search spaces within a coreset in accordance with various aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to common reference signals for multiple search spaces within a coreset, etc.). Information may be passed on to other components of the device. Receiver 1110 may be an example of aspects of the transceiver 1335 described with reference to FIG. 13. Receiver 1110 may utilize a single antenna or a set of antennas.

UE communications manager 1115 may be an example of aspects of UE communications manager 1315 described with reference to FIG. 13. UE communications manager 1115 may include coreset configuration manager 1125, coreset manager 1130, reference signal manager 1135, and reference signal descrambler 1140. Coreset configuration manager 1125 may identify a configuration for coresets, each coreset including a CSS and a USS. In some cases, coreset configuration manager 1125 may receive an indication of the configuration of the coreset in a PBCH or an RRC message.

Coreset manager 1130 may receive a coreset during a TTI. In some cases, the coreset may span one or more symbols and reference signals may be received in the one or more symbols. In some cases, the coreset may span a plurality of symbols, and the reference signals may be received in a subset of the plurality of symbols of the coreset. Reference signal manager 1135 may identify reference signals in the CSS and the USS of the received coreset. In some cases, the identified reference signals may include a common sequence for the coreset. In such cases, reference signal manager 1135 may decode or demodulate the CSS and the USS based at least in part on the identified reference signals. Reference signal descrambler 1140 may descramble the identified reference signals based on a descrambling sequence common to the CSS and the USS. In some cases, descrambling the identified reference signals based on a descrambling sequence common to the CSS and the USS includes descrambling the identified reference signals based on an RNTI.

Transmitter 1120 may transmit signals generated by other components of the device. In some examples, transmitter 1120 may be collocated with a receiver 1110 in a transceiver module. For example, transmitter 1120 may be an example of aspects of the transceiver 1335 described with reference to FIG. 13. Transmitter 1120 may utilize a single antenna or a set of antennas.

Figure 12:
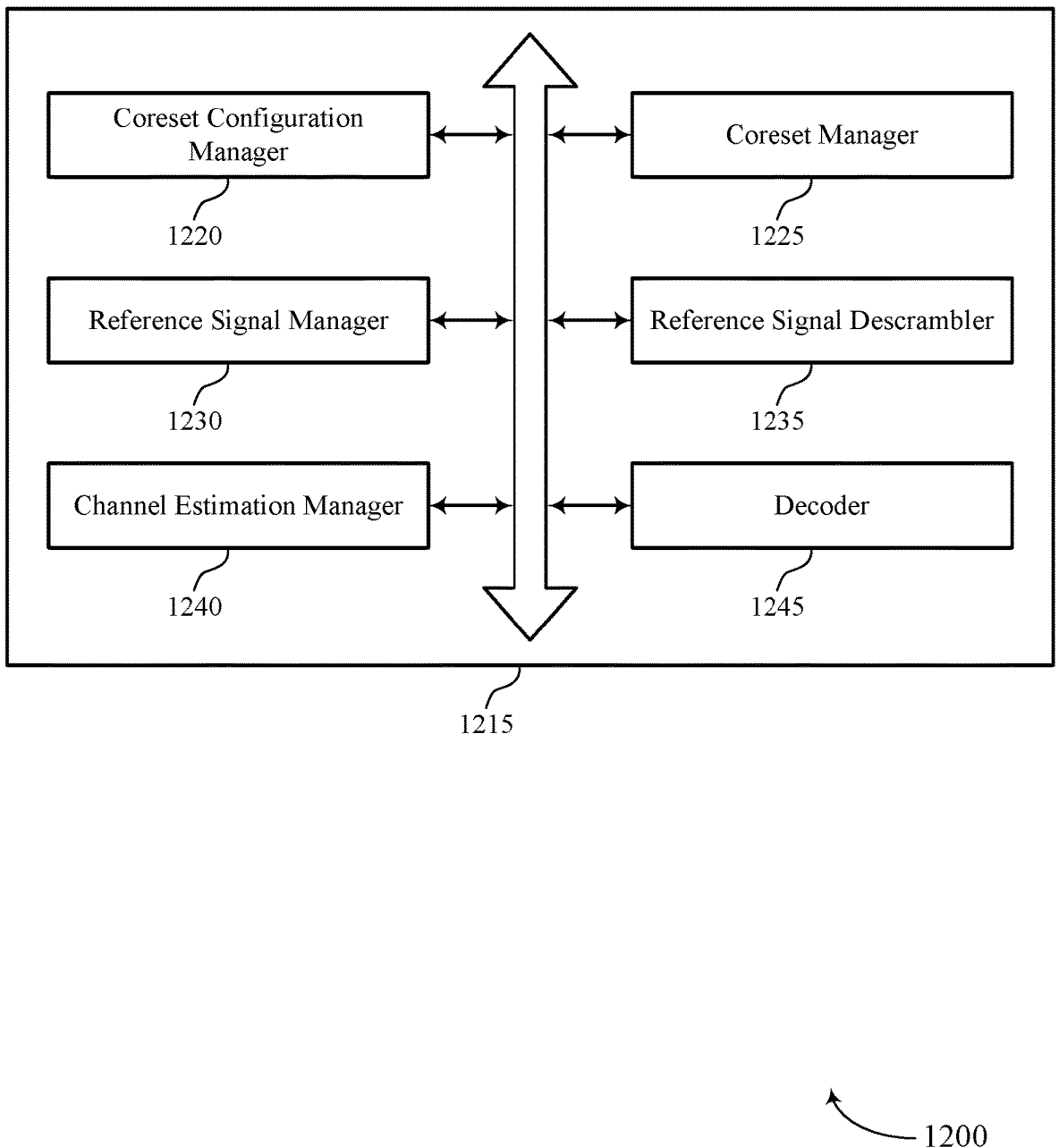

FIG. 12 shows a block diagram 1200 of UE communications manager 1215 that supports common reference signals for multiple search spaces within a coreset in accordance with various aspects of the present disclosure. UE communications manager 1215 may be an example of aspects of UE communications manager 1015, 1115, and 1315 described with reference to FIGS. 10, 11, and 13. UE communications manager 1215 may include coreset configuration manager 1220, coreset manager 1225, reference signal manager 1230, reference signal descrambler 1235, channel estimation manager 1240, and decoder 1245. Each of these modules may communicate, directly or indirectly, with one another (e.g., via one or more buses).

Coreset configuration manager 1220 may identify a configuration for coresets, each coreset including a CSS and a USS. In some cases, coreset configuration manager 1220 may receive an indication of the configuration of the coreset in a PBCH or an RRC message. Coreset manager 1225 may receive a coreset during a TTI. In some cases, the coreset may span one or more symbols, and reference signals may be received in the one or more symbols. In some cases, the coreset spans a plurality of symbols, and the reference signals may be received in a subset of the plurality of symbols of the coreset.

Reference signal manager 1230 may identify reference signals in the CSS and the USS of the received coreset. In some cases, the identified reference signals may include a common sequence for the coreset. Reference signal manager 1230 may decode or demodulate the CSS and the USS based at least in part on the identified reference signals. Reference signal descrambler 1235 may descramble the identified reference signals based on a descrambling sequence common to the CSS and the USS. In some cases, descrambling the identified reference signals based on a descrambling sequence common to the CSS and the USS includes descrambling the identified reference signals based on a radio network temporary identifier.

Channel estimation manager 1240 may perform channel estimation on a channel based on the decoded or demodulated reference signals, the channel carrying the received coreset. Decoder 1245 may decode or demodulate the CSS and the USS based at least in part on the identified reference signals. In some cases, decoder 1245 may decode control information in the CSS and the USS based on performing channel estimation on the channel.

Figure 13:
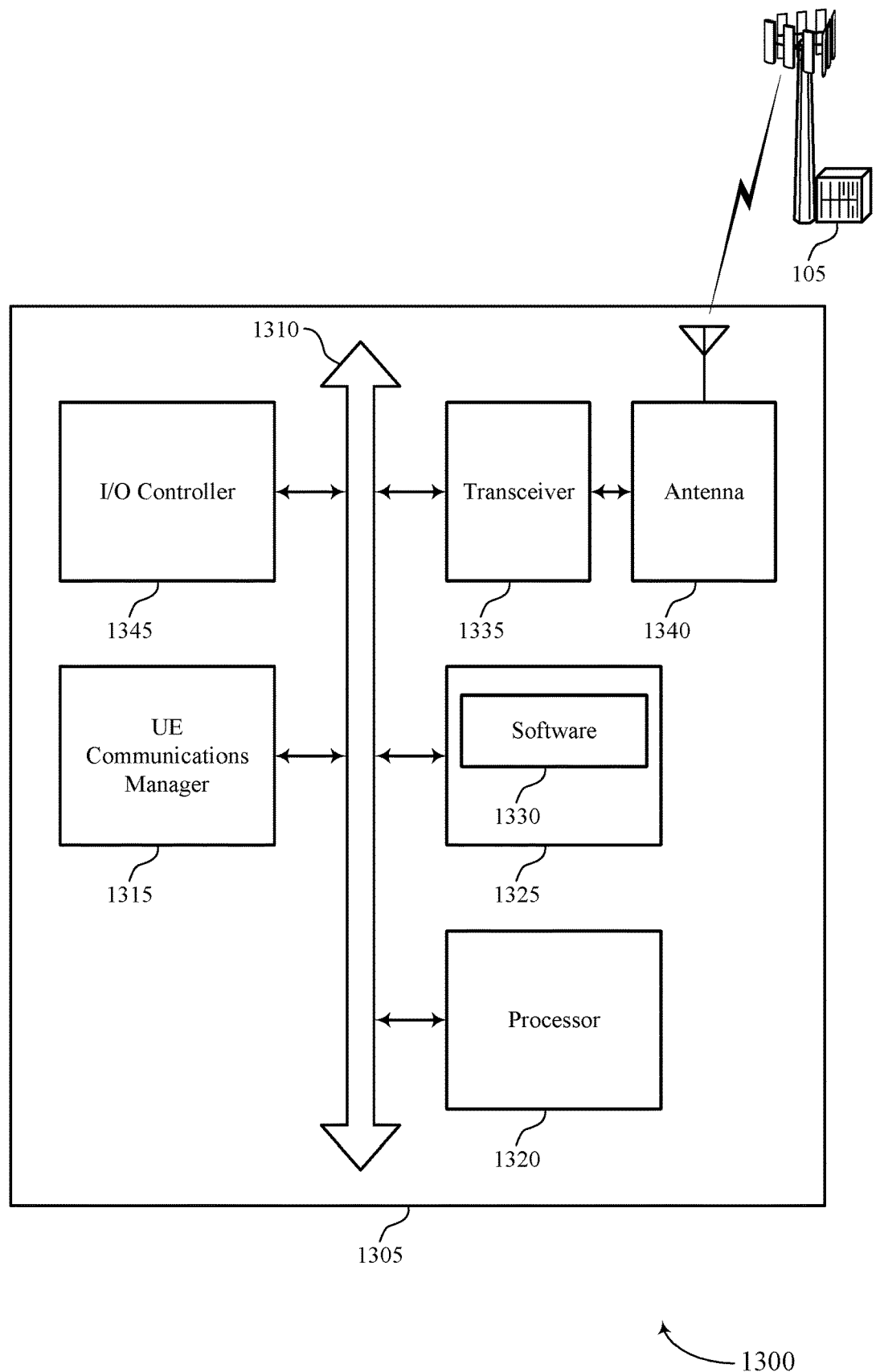
FIG. 13 illustrates a block diagram of a system including a user equipment (UE) that supports common reference signals for multiple search spaces within a coreset in accordance with various aspects of the present disclosure.

FIG. 13 shows a diagram of a system 1300 including a device 1305 that supports common reference signals for multiple search spaces within a coreset in accordance with various aspects of the present disclosure. Device 1305 may be an example of or include the components of UE 115 as described above, e.g., with reference to FIG. 1. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting common reference signals for multiple search spaces within a coreset).

Memory 1325 may include RAM and ROM. Memory 1325 may store computer-readable, computer-executable software 1330 including instructions that, when executed, cause processor 1320 to perform various functions described herein. In some cases, memory 1325 may contain, among other things, a BIOS which may control basic hardware or software operation such as the interaction with peripheral components or devices.

Software 1330 may include code to implement aspects of the present disclosure, including code to support common reference signals for multiple search spaces within a coreset. Software 1330 may be stored in a non-transitory computer-readable medium such as system memory or other memory. In some cases, software 1330 may not be directly executable by processor 1320 but may cause a computer (e.g., when compiled and executed) to perform functions described herein.

Transceiver 1335 may communicate bi-directionally, via one or more antennas, wired, or wireless links as described above. For example, transceiver 1335 may represent a wireless transceiver and may communicate bi-directionally with another wireless transceiver. Transceiver 1335 may also include a modem to modulate the packets and provide the modulated packets to the antennas for transmission, and to demodulate packets received from the antennas.

In some cases, the device 1305 may include a single antenna 1340. However, in some cases the device 1305 may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
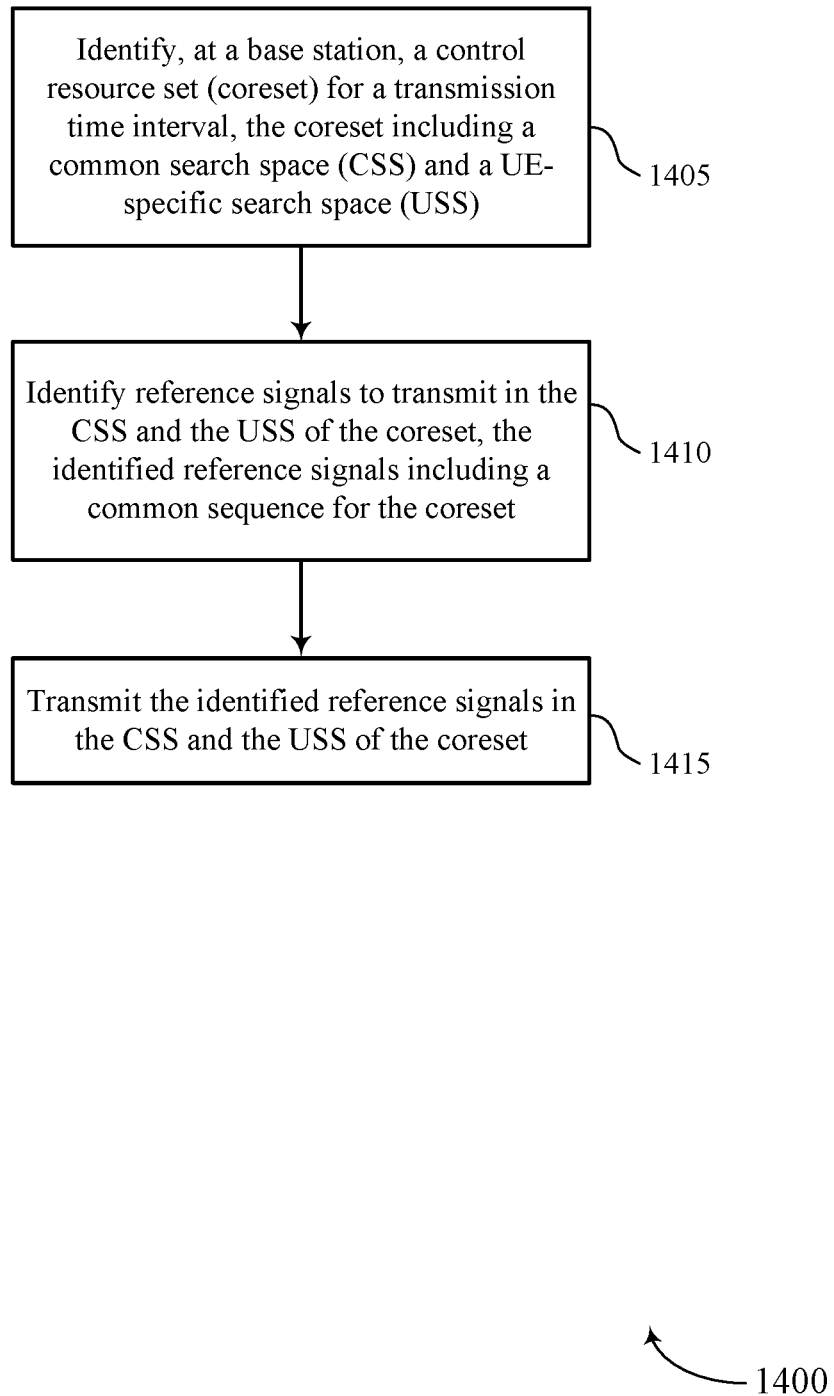
FIGS. 14 and 15 illustrate methods for utilizing common reference signals for multiple search spaces within a coreset in accordance with various aspects of the present disclosure.

FIG. 14 shows a flowchart illustrating a method 1400 for common reference signals for multiple search spaces within a coreset in accordance with various aspects of the present disclosure. The operations of method 1400 may be implemented by a base station 105 or its components as described herein. For example, the operations of method 1400 may be performed by base station communications manager 615, 715, 815, and 915 as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405, the base station 105 may identify a coreset for a TTI, the coreset including a CSS and a USS. The operations of block 1405 may be performed according to the methods described herein. In certain examples, aspects of the operations of block 1405 may be performed by coreset manager 725 and 820 as described with reference to FIGS. 6 through 9.

At block 1410, the base station 105 may identify reference signals to transmit in the CSS and the USS of the coreset. In some cases, the identified reference signals may include a common sequence for the coreset. The operations of block 1410 may be performed according to the methods described herein. In certain examples, aspects of the operations of block 1410 may be performed by reference signal manager 730 and 825 as described with reference to FIGS. 6 through 9.

At block 1415, the base station 105 may transmit the identified reference signals in the CSS and the USS of the coreset. The operations of block 1415 may be performed according to the methods described herein. In certain examples, aspects of the operations of block 1420 may be performed by transmitter 620, transmitter 720, and transceiver 935 as described with reference to FIGS. 6, 7, and 9.

Figure 15:
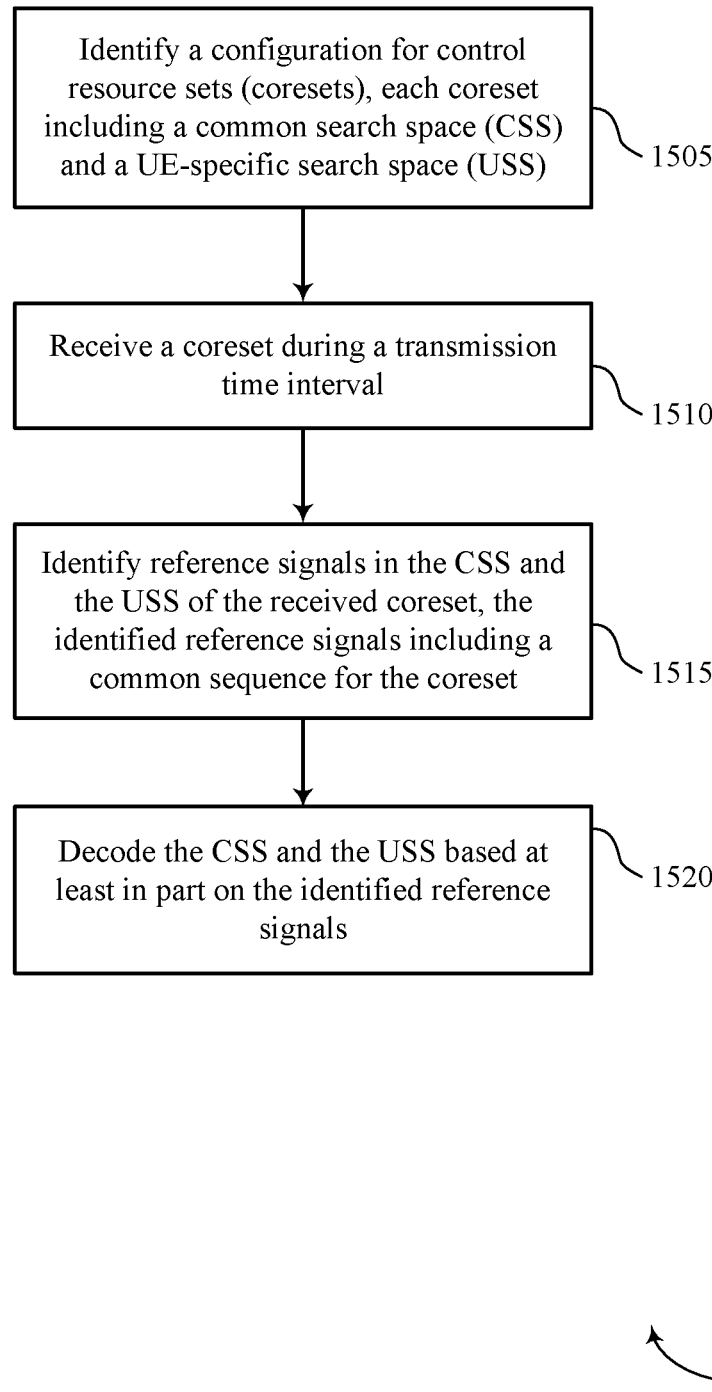

FIG. 15 shows a flowchart illustrating a method 1500 for common reference signals for multiple search spaces within a coreset in accordance with various aspects of the present disclosure. The operations of method 1500 may be implemented by a UE 115 or its components as described herein. For example, the operations of method 1500 may be performed by UE communications manager 1015, 1115, 1215, and 1315 as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may identify a configuration for coresets, each coreset including a CSS and a USS. The operations of block 1505 may be performed according to the methods described herein. In certain examples, aspects of the operations of block 1505 may be performed by coreset configuration manager 1125 and 1220 as described with reference to FIGS. 10 through 13.

At block 1510, the UE 115 may receive a coreset during a TTI. The operations of block 1510 may be performed according to the methods described herein. In certain examples, aspects of the operations of block 1510 may be performed by coreset manager 1130 and 1225 as described with reference to FIGS. 10 through 13.

At block 1515, the UE 115 may identify reference signals in the CSS and the USS of the received coreset. In some cases, the identified reference signals may include a common sequence for the coreset. The operations of block 1515 may be performed according to the methods described herein. In certain examples, aspects of the operations of block 1515 may be performed by reference signal manager 1135 and 1230 as described with reference to FIGS. 10 through 13.

At block 1520, the UE 115 may decode, demodulate, or descramble the CSS and the USS based at least in part on the identified reference signals. The operations of block 1520 may be performed according to the methods described herein. In certain examples, aspects of the operations of block 1520 may be performed by reference signal descrambler 1140 and 1235, decoder 1245, reference signal manager 1135 and 1230 as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a base station, a control resource set (coreset) for a transmission time interval, the coreset including a common search space (CSS) and a user equipment (UE)-specific search space (USS);
   identifying reference signals to transmit in the CSS and the USS of the coreset, the identified reference signals comprising a common sequence for the coreset; and
   transmitting the identified reference signals in the CSS and the USS of the coreset.

2. The method of claim 1, further comprising:
   transmitting an indication of a configuration of the coreset in a physical broadcast channel (PBCH) or a radio resource control (RRC) message.

3. The method of claim 1, further comprising:
   identifying the common sequence for the coreset, wherein the common sequence is based at least in part on a radio network temporary identifier.

4. The method of claim 1, further comprising:
   precoding the coreset, including the identified reference signals, using a same precoder.

5. The method of claim 1, further comprising:
   precoding the coreset, including the identified reference signals, using a contiguous precoder.

6. The method of claim 1, further comprising:
   precoding each control channel element (CCE) of a plurality of CCEs of the coreset, including the identified reference signals, using one of a plurality of different precoders.

7. The method of claim 1, further comprising:
   precoding a plurality of resource element groups (REGs) of a control channel element (CCE) of the coreset, including the identified reference signals, using one of a plurality of different precoders for each of the plurality of REGs.

8. The method of claim 1, wherein the coreset spans one or more symbols, the identified reference signals transmitted in the one or more symbols of the coreset.

9. The method of claim 1, wherein the CSS has a first aggregation level, and the USS has a second aggregation level different than the first aggregation level.

10. The method of claim 1, further comprising:
    precoding the reference signals within a resource element group (REG) bundle of a plurality of REG bundles of the coreset using a same precoder or a contiguous precoder.

11. The method of claim 10, wherein precoding the reference signals within each REG bundle of the plurality of REG bundles of the coreset comprises:
    precoding the reference signals within a first REG bundle of the plurality of REG bundles using a first precoder; and
    precoding the reference signals within a second REG bundle of the plurality of REG bundles using a second precoder different from the first precoder.

12. The method of claim 1, further comprising:
    precoding the reference signals across the coreset using a same precoder or a contiguous precoder.

13. A method for wireless communication at a user equipment (UE), comprising:
    identifying a configuration for control resource sets (coresets), each coreset including a common search space (CSS) and a UE-specific search space (USS);
    receiving a coreset during a transmission time interval;
    identifying reference signals in the CSS and the USS of the received coreset, the identified reference signals comprising a common sequence for the coreset; and
    decoding the CSS and the USS based at least in part on the identified reference signals.

14. The method of claim 13, further comprising:
    receiving an indication of the configuration of the coreset in a physical broadcast channel (PBCH) or a radio resource control (RRC) message.

15. The method of claim 13, wherein decoding the CSS and the USS based at least in part on the identified reference signals comprises:
    decoding the identified reference signals based at least in part on a radio network temporary identifier.

16. The method of claim 13, further comprising:
    performing channel estimation on a channel based at least in part on decoded reference signals, the channel carrying the received coreset.

17. The method of claim 16, further comprising:
    decoding control information in the CSS and the USS based at least in part on channel estimation performed on the channel.

18. The method of claim 13, wherein the coreset spans one or more symbols, the identified reference signals received in the one or more symbols of the coreset.

19. An apparatus for wireless communication, comprising:
    means for identifying, at a base station, a control resource set (coreset) for a transmission time interval, the coreset including a common search space (CSS) and a user equipment (UE)-specific search space (USS);

means for identifying reference signals to transmit in the CSS and the USS of the coreset, the identified reference signals comprising a common sequence for the coreset; and means for transmitting the identified reference signals in the CSS and the USS of the coreset.

20. The apparatus of claim 19, further comprising:
means for transmitting an indication of a configuration of the coreset in a physical broadcast channel (PBCH) or a radio resource control (RRC) message.

21. The apparatus of claim 19, further comprising:
means for identifying the common sequence for the coreset, wherein the common sequence is based at least in part on a radio network temporary identifier.

22. An apparatus for wireless communication at a user equipment (UE), comprising:
means for identifying a configuration for control resource sets (coresets), each coreset including a common search space (CSS) and a UE-specific search space (USS);
means for receiving a coreset during a transmission time interval;
means for identifying reference signals in the CSS and the USS of the received coreset, the identified reference signals comprising a common sequence for the coreset; and
means for decoding the CSS and the USS based at least in part on the identified reference signals.

23. The apparatus of claim 22, further comprising:
means for receiving an indication of the configuration of the coreset in a physical broadcast channel (PBCH) or a radio resource control (RRC) message.

24. The apparatus of claim 22, wherein the means for decoding the CSS and the USS based at least in part on the identified reference signals comprises:
means for decoding the identified reference signals based at least in part on a radio network temporary identifier.

25. An apparatus for wireless communication, comprising:
a processor;
memory in electronic communication with the processor; and
instructions stored in the memory and operable, when executed by the processor, to cause the apparatus to:
identify, at a base station, a control resource set (coreset) for a transmission time interval, the coreset including a common search space (CSS) and a UE-specific search space (USS);
identify reference signals to transmit in the CSS and the USS of the coreset, the identified reference signals comprising a common sequence for the coreset; and
transmit the identified reference signals in the CSS and the USS of the coreset.

26. The apparatus of claim 25, wherein the instructions are further executable by the processor to cause the apparatus to:
transmit an indication of a configuration of the coreset in a physical broadcast channel (PBCH) or a radio resource control (RRC) message.

27. The apparatus of claim 25, wherein the instructions are further executable by the processor to cause the apparatus to:
identify the common sequence for the coreset, wherein the common sequence is based at least in part on a radio network temporary identifier.

28. The apparatus of claim 25, wherein the instructions are further executable by the processor to cause the apparatus to:
precode the coreset, including the identified reference signals, using a same precoder.

29. The apparatus of claim 25, wherein the instructions are further executable by the processor to cause the apparatus to:
precode the coreset, including the identified reference signals, using a contiguous precoder.

30. The apparatus of claim 25, wherein the instructions are further executable by the processor to cause the apparatus to:
precode each control channel element (CCE) of a plurality of CCEs of the coreset, including the identified reference signals, using one of a plurality of different precoders.

31. The apparatus of claim 25, wherein the instructions are further executable by the processor to cause the apparatus to:
precode a plurality of resource element groups (REGs) of a control channel element (CCE) of the coreset, including the identified reference signals, using one of a plurality of different precoders for each of the plurality of REGs.

32. The apparatus of claim 25, wherein the coreset spans one or more symbols, the identified reference signals transmitted in the one or more symbols of the coreset.

33. The apparatus of claim 25, wherein the CSS has a first aggregation level, and the USS has a second aggregation level different than the first aggregation level.

34. The apparatus of claim 25, wherein the instructions are further executable by the processor to cause the apparatus to:
precode the reference signals within a resource element group (REG) bundle of a plurality of REG bundles of the coreset using a same precoder or a contiguous precoder.

35. The apparatus of claim 34, wherein the instructions are further executable by the processor to cause the apparatus to:
precode the reference signals within a first REG bundle of the plurality of REG bundles using a first precoder; and
precode the reference signals within a second REG bundle of the plurality of REG bundles using a second precoder different from the first precoder.

36. The apparatus of claim 25, wherein the instructions are further executable by the processor to cause the apparatus to:
precode the reference signals across the coreset using a same precoder or a contiguous precoder.

37. An apparatus for wireless communication, at a user equipment (UE) comprising:
a processor;
memory in electronic communication with the processor; and
instructions stored in the memory and operable, when executed by the processor, to cause the apparatus to:
identify a configuration for control resource sets (coresets), each coreset including a common search space (CSS) and a UE-specific search space (USS);
receive a coreset during a transmission time interval;
identify reference signals in the CSS and the USS of the received coreset, the identified reference signals comprising a common sequence for the coreset; and
decode the CSS and the USS based at least in part on the identified reference signals.

38. The apparatus of claim 37, wherein the instructions are further executable by the processor to cause the apparatus to:

receive an indication of the configuration of the coreset in a physical broadcast channel (PBCH) or a radio resource control (RRC) message.

39. The apparatus of claim 37, wherein the instructions are further executable by the processor to cause the apparatus to:
decode the identified reference signals based at least in part on a radio network temporary identifier.

40. The apparatus of claim 37, wherein the instructions are further executable by the processor to cause the apparatus to:
perform channel estimation on a channel based at least in part on decoded reference signals, the channel carrying the received coreset.

41. The apparatus of claim 40, wherein the instructions are further executable by the processor to cause the apparatus to:
decode control information in the CSS and the USS based at least in part on the performing channel estimation on the channel.

42. The apparatus of claim 37, wherein the coreset spans one or more symbols, the identified reference signals received in the one or more symbols of the coreset.

43. A non-transitory computer readable medium storing code for wireless communication, the code comprising instructions executable by a processor to:
identify, at a base station, a control resource set (coreset) for a transmission time interval, the coreset including a common search space (CSS) and a UE-specific search space (USS);
identify reference signals to transmit in the CSS and the USS of the coreset, the identified reference signals comprising a common sequence for the coreset; and
transmit the identified reference signals in the CSS and the USS of the coreset.

44. The non-transitory computer-readable medium of claim 43, wherein the instructions are further executable by the processor to:
transmit an indication of a configuration of the coreset in a physical broadcast channel (PBCH) or a radio resource control (RRC) message.

45. The non-transitory computer-readable medium of claim 43, wherein the instructions are further executable by the processor to:
identify the common sequence for the coreset, wherein the common sequence is based at least in part on a radio network temporary identifier.

46. A non-transitory computer readable medium storing code for wireless communication, the code comprising instructions executable by a processor to:
identify a configuration for control resource sets (coresets), each coreset including a common search space (CSS) and a UE-specific search space (USS);
receive a coreset during a transmission time interval;
identify reference signals in the CSS and the USS of the received coreset, the identified reference signals comprising a common sequence for the coreset; and
decode the CSS and the USS based at least in part on the identified reference signals.

47. The non-transitory computer-readable medium of claim 46, wherein the instructions are further executable by the processor to:
receive an indication of the configuration of the coreset in a physical broadcast channel (PBCH) or a radio resource control (RRC) message.

48. The non-transitory computer-readable medium of claim 46, wherein the instructions are further executable by the processor to:
decode the identified reference signals based at least in part on a radio network temporary identifier.

* * * * *